US012769594B1

(12) United States Patent
Robinson et al.

(10) Patent No.: US 12,769,594 B1
(45) Date of Patent: Oct. 20, 2026

(54) ACTION AUTOMATION ACROSS ONE OR MORE DEVICES

(71) Applicant: Amazon Technologies, Inc., Seattle, WA (US)

(72) Inventors: Quentin N Robinson, Springfield, NJ (US); Namita Atri, Issaquah, WA (US); Sean Dennis Connell, Chandler, AZ (US); Joshua Virgil Marso, Redmond, WA (US); Chih Yen Lin, Bellevue, WA (US); Kevin Mayhew, Forest Hill, MD (US)

(73) Assignee: Amazon Technologies, Inc., Seattle, WA (US)

( * ) Notice: Subject to any disclaimer, the term of this patent is extended or adjusted under 35 U.S.C. 154(b) by 22 days.

(21) Appl. No.: 18/899,437

(22) Filed: Sep. 27, 2024

(51) Int. Cl.
*G06F 9/40* (2006.01)
*G06F 9/54* (2006.01)
*G06N 20/00* (2019.01)
*H04L 9/40* (2022.01)

(52) U.S. Cl.
CPC ............. *G06F 9/543* (2013.01); *G06N 20/00* (2019.01); *H04L 63/102* (2013.01)

(58) Field of Classification Search
CPC ........ G06F 9/543; G06N 20/00; H04L 63/102
USPC .............................................................. 726/4
See application file for complete search history.

(56) References Cited

U.S. PATENT DOCUMENTS 11,018,939 B1 * 5/2021 Harris .................. G06K 7/1413
2017/0214701 A1 * 7/2017 Hasan ................. H04L 63/1433
2017/0345420 A1 * 11/2017 Barnett, Jr. ......... G10L 15/1815
2019/0025782 A1 * 1/2019 Mathews ............... G05B 15/02
2019/0101306 A1 * 4/2019 Giorgi ...................... F24F 13/10
2019/0238358 A1 * 8/2019 Hurewitz ............ H04L 12/4625
2020/0067776 A1 * 2/2020 Williams ............ H04L 41/0876
2020/0186378 A1 * 6/2020 Six .......................... H04L 41/12
2020/0275266 A1 * 8/2020 Jakobsson ............... H04W 4/90
2020/0394332 A1 * 12/2020 Jakobsson ......... G06F 16/24573
2021/0174095 A1 * 6/2021 Kong ..................... G06V 40/20
2023/0044362 A1 * 2/2023 Ulen ......................... H04L 9/14
2023/0252984 A1 * 8/2023 Natarajan ............... G10L 15/22 704/243
2023/0393714 A1 * 12/2023 Giuliani .................. G06F 3/165
2024/0345652 A1 * 10/2024 Subramanyaiah ...... G06F 3/011
2025/0337786 A1 * 10/2025 Shade ..................... H04L 63/20

OTHER PUBLICATIONS

Javier Rojo; Automating the Interactions among IoT Devices using Neural Networks; IEEE:2020; pp. 1-6.*

* cited by examiner

*Primary Examiner* — Monjur Rahim
(74) *Attorney, Agent, or Firm* — Kilpatrick Townsend & Stockton LLP

(57) ABSTRACT

Techniques for action correlation for multiple devices is described herein. In an example, a computer system determines first contextual data associated with a first device. The computer system determines second contextual data associated with a second device. The first device and the second device are associated with an account. The computer system generates, based at least in part on the first contextual data and the second contextual data, configuration data indicating a trigger to be detected by at least one of the first device or the second device and an action to be executed by at least one of the first device or the second device upon the trigger being detected. The computer system associates the configuration data with the account.

23 Claims, 22 Drawing Sheets

ACTION AUTOMATION ACROSS ONE OR MORE DEVICES

BACKGROUND

Many computing devices, such as consumer electronics, support wireless connectivity. Typically, a computing device connects to a wireless access point that provides access to a data network. Additionally, the computing device can connect directly with another computing device. In many cases, functionalities of the computing device may become available only after the device is registered with a user account. Typically, the registration involves identifying the device and the user account.

BRIEF DESCRIPTION OF THE DRAWINGS

Various embodiments in accordance with the present disclosure will be described with reference to the drawings, in which.

DETAILED DESCRIPTION

Figure 1:
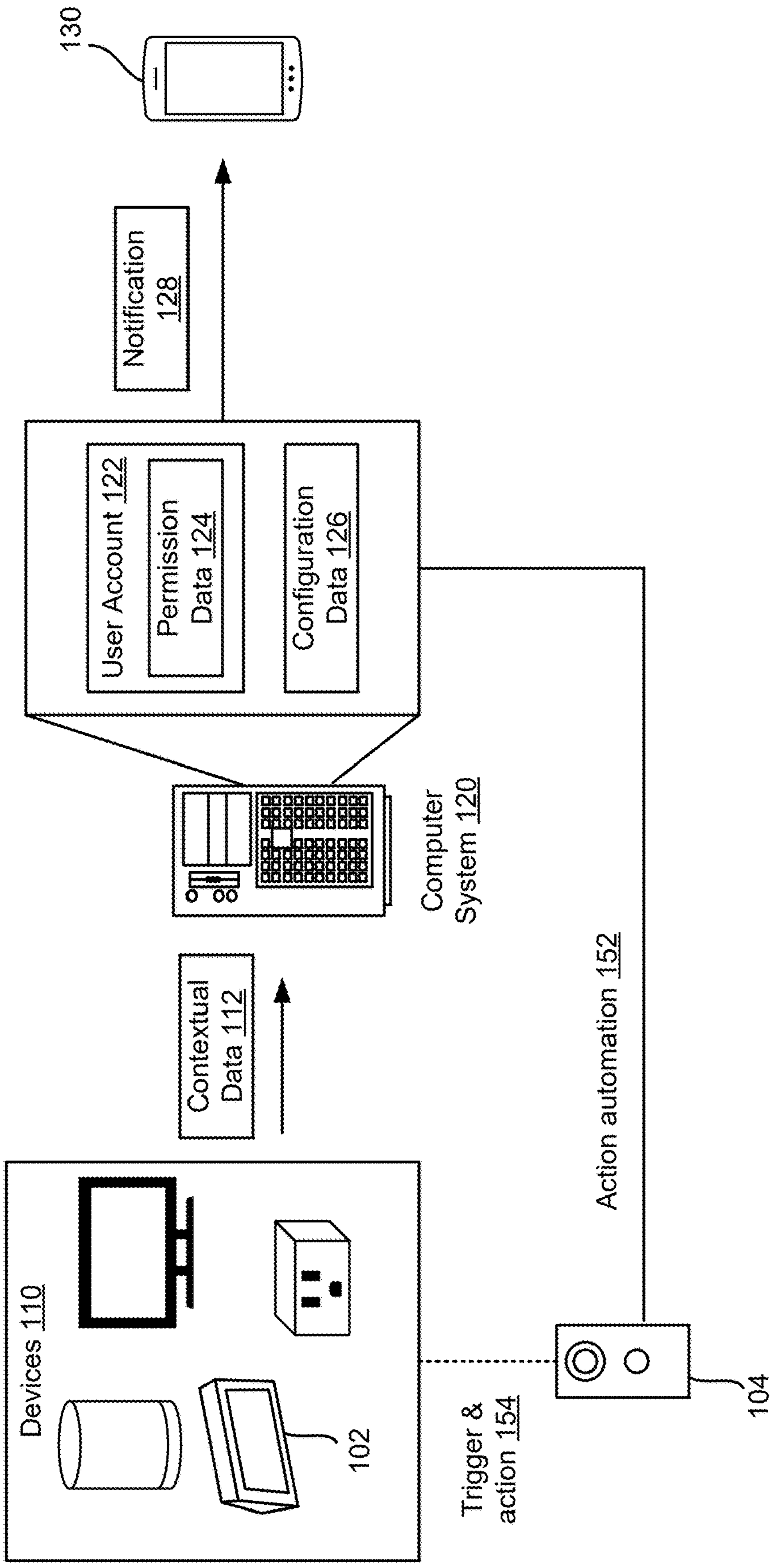
FIG. 1 illustrates an example of a computing environment for action coordination across multiple devices, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, action automation across one or more devices. A user account can be associated with multiple devices that may inter-communicate (directly or indirectly) to perform actions. To automatically implement device-executable action, configuration data (also referred to as routines) can be generated and can define the device-executable actions. To generate the configuration data, a computer system can determine contextual data associated with devices of the account. The contextual data includes a device identifier, a device type, and/or information about the intent of how the device is to be used. For example, the information about the intent of how the device is to be used can include a device name, a device location, a device-to-device proximity, a device group, a device supported capability, or a natural language description of device use. The computer system can generate configuration data based on the contextual data. For instance, the computer system may determine that conditions for the contextual data are met for generating configuration data, or the computer system may use a machine learning model to generate the configuration data based on the contextual data. The configuration data indicates a trigger event that is to be detected by at least one of the devices and an action to be executed by at least another one of the devices upon the trigger event being detected. Once the configuration data is generated, it can be associated with the account such that the action is performed when the trigger event is detected.

To illustrate, consider a user account under which for a smart television is registered. A user device (e.g., a smartphone) may be operated to add additional devices to the user account. For example, after obtaining a security camera, a mobile application executing on the device can be used to request or complete a registration of the security camera with the user account. When the security camera is registered, a computer system (e.g., a cloud based server) can determine if any automated device-executable actions are possible. The computer system can determine contextual data for each of the smart television and the security camera to determine whether an action should be automated for the device pair. For instance, the contextual data for both devices may indicate that the smart television and the security camera belong to a same device group and that their use is for security purposes. As such, upon determining a match between the contextual data for the devices, the computer system can determine that an action of presenting camera footage on the smart television upon motion being detected by the camera is to be automated (motion detection is an example of a trigger event). To do so, the computer system generates configuration data that indicates that the smart television is to present camera footage when motion is detected by the camera. The configuration data can then be associated with the account and a notification about the automation of the action using the trigger event can be presented via the user device.

Embodiments of the present disclosure provide several technical advantages over existing systems and methods for action coordination. For example, the embodiments enable devices to coordinate their functions, where a device can execute a function based on a capability of another device, when for example both devices are on a same network and/or associated with the same account. By relying on the devices being associated with the same account, additional security and proper automation for the actions can be achieved. In addition, automating the creation of routines can minimize the resources that are conventionally used to navigate through multiple web pages or user interfaces to manually configure automations. Moreover, the embodiments provide redundancy checks such that data for redundant automations are not created and/or maintained in the system.

FIG. 1 illustrates an example of a computing environment for action coordination across multiple devices, according to an embodiment of the present disclosure. As illustrated in FIG. 1, a computer system 120 (e.g., a set of servers, possibly available in one or more datacenters and hosting one or more cloud based services) stores account information about a user account 122 including information about devices that are associated with the user account 122. In addition, the user account 122 can include permission data 124 that is associated with the user account 122. The permission data 124 indicates a permission to automate one or more device-executable actions. The permission data 124 may be associated with the user account 122 in response to a user input via a user interface (e.g., at a user device 130). This input could be specific to a new device 104 (e.g., provided at a checkout web page used to obtain the new device 104), or can be account wide (e.g., a setting under a management application, or possibly a selection in the management application to create automation actions).

In FIG. 1, the user account 122 can be associated with devices 110. An example of association includes the devices 110 being registered under the user account 122 (e.g., identified in account data stored for the user account 122 and having at least some functionalities controlled based on the account data). Initially, the user account 122 may be associated with a display device 102 and other devices (shown as a smart speaker and a smart television). A new device, such as a smart doorbell 104, can then be registered to the user account 122. Of course, the embodiments of the present disclosure similarly apply to any other type of user devices including internet of things (IoT) devices, such as a smart appliance, a smart control system (e.g., a thermostat), a smart set top box, a smart sensor, and the like. The computer system 120 can receive event data indicating that the smart doorbell 104 has been associated with the user account 122. For instance, the event data may be associated with a registration of the smart doorbell 104 with the user account 122, an update to the smart doorbell 104 such as a name change, a location change, etc., or an account request to create automated actions across the devices 110 of the user account 122. As used herein, a device represents an end user device that includes one or more memories that store instructions, one or more processors that can execute the instructions, and one or more interfaces. The device can include a communication interface that enables the user device to communicate with another device directly or via a data network. The communication interface can also enable the device to communicate with a remote computer system, such as a server. The device can also include a user interface. The user interface can be a graphical user interface (e.g., one that uses a screen for output and possibly for input) or a voice-based interface (e.g., one that uses a speaker for output and/or a microphone for input). As used herein, the device is different from the computer system. Certain functionalities can be distributed between the device and the computer system (e.g., according to client-server architecture).

In an example, upon receiving the event data indicating that the smart doorbell 104 is associated with the user account 122, the computer system 120 can determine contextual data 112 associated with the smart doorbell 104. The contextual data 112 may indicate a device identifier, a device type, and/or how the device (e.g., the smart doorbell 104) is to be used. For instance, the contextual data 112 may include the device identifier (e.g., a serial number of the smart doorbell 104), the device type (e.g., a description of a category of devices to which the smart doorbell 104 belongs, a description of functionalities of the smart doorbell 104, etc.) and/or information about the intent of how the device (e.g., the smart doorbell 104) is to be used. The information about the intent of how the device is to be used can include a device name, a device location, a device-to-device proximity, a device group, a device supported capability, or a natural language description of device use. For example, an intent to group devices into a device group may be inferred based on their locations (e.g., belonging to the same room in a space), or a bundle of devices (e.g., a purchased bundle that includes multiple devices). In addition, the contextual data 112 may involve a promotion for a set of devices. That is and as further described herein below, if an online marketplace is promoting a smart doorbell to be purchased with a security camera, then if a user buys the bundle, an automation action may automatically be created for the smart doorbell to trigger image capturing by the security camera. Other types of contextual data can also be used, as further described herein below. For instance, contextual data can be associated with the user account 122 and can indicate any or a combination of: existing routines, a routine usage history, past user interactions with or user inputs at devices associated with the user account 122, timings of and sequences between such user interactions or user inputs (e.g., that a user interaction with a first device was followed shortly after a user interaction with a second device), the types of requested or executed actions, and the like.

The computer system 120 can also determine the contextual data 112 associated with the other devices associated with the user account 122. For instance, the computer system 120 can determine the contextual data 112 associated with the display device 102. The contextual data 112 for the display device 102 can similarly include a device name, a device location, a device-to-device proximity, a device group, a device supported capability, or a natural language description of device use. The contextual data 112 may be determinable from the information stored in the user account 122. Or the computer system 120 may send a request for the contextual data 112 to the display device 102, which can respond to the request with the contextual data 112.

In an example, a data store (not illustrated in FIG. 1), such as a database, stores account data for a plurality of accounts. The computer system 120 can use an identifier of the user account 122 to query the data store and retrieve account data specific to the user account 122. The retrieved account data can include contextual data associated with devices registered with the user account 122 (e.g., having device identifiers included in the account data of the user account 122).

In an example, the computer system 120 can determine an action automation 152 based on the permission data 124 and the contextual data 112 for the display device 102 and the smart doorbell 104. Automating an action or a use of a device can refer to generating configuration data that indicates the action and the trigger event to execute the action, where the configuration data is generated without user input specifying the action, the trigger, or other aspects of the configuration data. For example, no user input via a user interface of any of the devices 110, the smart doorbell 104, or the device 130 may be needed to generate configuration data 126 that defines the action automation 152. Instead, based on the permission data 124 indicating the permission to automate device-executable actions, the computer system 120 can proceed with processing the contextual data 112 to generate the configuration data 126. The processing is further described herein below. In an illustration, based on the contextual data 112 indicating that the display device 102 and the smart doorbell 104 are associated with the same device group, the computer system 120 can determine a trigger event and an action 154. A trigger event is also referred to herein as a trigger and can be referred to as a triggering event synonymously. In another illustration, based on the contextual data 112 indicating that the display device 102 has a user interface for displaying video content and the smart doorbell 104 has a camera for capturing live video, the computer system 120 can determine the trigger and the action 154 The trigger can represent an event that causes the action to be performed. The action can be a set of operations that a device can execute. For instance, in the use case of the display 102 and the smart doorbell 104, the action automation 152 can include displaying image data on the display device 102 (the action) upon a button press of the smart doorbell 104 (the trigger). This image data can be captured by the camera of the smart doorbell 104 and/or another camera of the devices 110. The action automation 152 need not involve a manual process to define the trigger and/or the action. Instead, the system can generate the configuration data 126 that defines the action automation 152.

In an example, the configuration data 126 may correspond to a routine that can be defined for one or more devices. The configuration data 126 indicates that the action is to be executed by a device upon a trigger being detected by another device. For instance, for the example of the display device 102 and the smart doorbell 104 in FIG. 1, the configuration data 126 can indicate that the triggering device is the smart doorbell 104, the trigger is a button press, the action device is the display device 102, and the action is to image data captured by the smart doorbell 104 and/or another device.

Upon generating the configuration data 126, the computer system 120 can associate the configuration data 126 with the user account 122. Associating the configuration data 126 with the user account 122 can include including the configuration data 126 in account data of the user account 122, where the account data is stored in the data store. The configuration data 126 can describe the action, the trigger, the action device (e.g., the corresponding device identifier), and the trigger device (the corresponding device identifier). The configuration data 126 can also be stored in associated with a configuration identifier (e.g., in a key-value pair in the data store, where the configuration identifier can be the key, and the value can include the description of the action, the trigger, the action device, and the trigger device). Further, the computer system 120 can cause the triggering device to monitor the trigger event and inform the computer system 120 about occurrence of the trigger event. For instance, the computer system 120 can send a set of instructions (e.g., as a directive) to the triggering device defining parameters of the trigger event and commanding the trigger device to send event data upon the trigger event being detected according to the parameters. The computer system 120 can specify the granularity of the event data that needs to be reported (e.g., as a flag set to "true" and/or as including the configuration identifier and the other information such as a timestamp, location information, sensor data, etc.). Upon the event data being received indicating the trigger event's occurrence, the computer system 120 can determine the applicable configuration data 126 from the account data (e.g., by retrieving this data from the data store using the account identifier, the device identifier of the trigger device, and/or the configuration identifier). Based on the retrieved configuration data 126, the computer system 120 can identify the action device and the action and can send a set of instructions (e.g., as a directive) to the action device. This set of instructions can identify the action and command the action device to execute it.

In addition, the computer system 120 can send a notification 128 to a user device 130 associated with the user account 122. The notification 128 can include a description of the action and the trigger. The notification 128 is presented via a user interface of the user device 130. For instance, the notification 128 may be presented in a mobile application associated with the user account 122. In some instances, the routine or the notification 128 indicating the routine may be presented as a recommendation during the purchase of the new device (e.g., as a recommendation presented in the checkout page). Additionally, or alternatively, the user interface can also be a voice user interface (e.g., a smart speaker outputting audio indicating a new routine has been created). Or the user interface may be a graphical user interface that is not related to the mobile application. For instance, a display device or a smart television display the notification 128 about the new routine.

In an example, the new routine may not involve the new device. To illustrate, consider the use case of an air quality monitor. This monitor may be registered under a user account that already includes a display device. Upon registering the air quality monitor under the user account, a routine can be created for the display device to show air quality data about the geographic location where the user is. The display device can do that on a daily basis (e.g., a morning routine to announce the news and show the air quality) and can get this data from a public weather server rather than from the air quality monitor.

Although FIG. 1 describes an action that is automated between two devices, embodiments are not limited as such. For instance, a routine may involve more than two devices where a first device detects a trigger (e.g., a trigger devices), and two or more other devices perform one or more actions based on the trigger detection (e.g., action devices). As an example, upon the smart doorbell 104 of FIG. 1 detecting motion, both the display device 102 and a smart television may display the live video stream from the smart doorbell 104. As another example, upon the smart doorbell 104 of FIG. 1 detecting motion, the display device 102 may display the live video stream from the smart doorbell 104 and a smart light in proximity to the smart doorbell 104 may be turned ON. Similarly, one more that one trigger can be described and/or more than one triggering devices can be identified in configuration data to automate one or more actions (on one or more action devices).

While FIG. 1 describes configuration data 126 for a routine, embodiments are not limited as such. For instance, a routine is one example of a configuration. Another example configuration is a device setting. So, if a user previously set up a device with a certain setting, and now a new device is added to the user account, the same setting can be applied to the new device. A configuration can define parameters for a program code. So, based on a configuration, program code can be created and used.

In the interest of clarity of explanation, routines are described in various embodiments. Generally, a routine represents a configuration that defines one or more actions that include an action, an action device that executes at least the action, one or more triggers that include a trigger for the action, and a trigger device that detects at least the trigger. However, the embodiments are not limited as such. Instead, the embodiments similarly apply to any action automation (e.g., including the generation of program code or device instructions) or configuration automation (e.g., including setting up a configuration of a device in light of configurations of other devices associated with the same user account, where the configuration can be a device setting(s)).

Furthermore, various embodiments are described in connection with an action automation (e.g, the definition of configuration data or a routine) that involves two devices. However, the embodiments are not limited as such. The action automation can involve a different number of devices. In one example, this number can vary over time, whereby it can be more than two at one point in time and can increase and/or decrease at a different time. Generally, configuration data can be generated and updated over time such that the automation can be adapted to different contexts and the relevant devices can collaborate accordingly. Below are a few examples of this adaptability.

In one example, say configuration data is defined as involving two devices. A contextual change can occur, where the configuration data is updated to involve a third device. To illustrate, consider the following use case. A routine is automatically generated for a smart doorbell and a first smart light bulb that are on a same home network and are registered under the same user account. Particularly, the smart doorbell and the first smart light bulb are set as a trigger device and action device, respectively. Upon an activation of the smart doorbell (e.g., via a button push), the first smart light bulb is turned ON (possibly based on the time of the day). A second smart bulb is added to the user account and connects to the home network (e.g., upon a completion of a registration process). The routine is updated (e.g., the corresponding configuration data) such that the second smart bulb becomes also an action device. As such, upon the activation of the smart doorbell, the second smart light bulb is also turned ON. Continuing with this illustration, consider that a security camera is purchased via a checkout page having a login associated with the user account. At the checkout page, user input is received describing that the security camera is to "increase the security monitoring of a backyard." Additionally, the name of the first smart bulb is updated to "backyard bulb." In this case, the existing routine (e.g., the corresponding configuration data) is updated, whereby the first smart light bulb is no longer associated therewith (e.g., is no longer an action device and, thus, would not be turned ON upon an activation of the smart doorbell). A second routine is defined (e.g., new configuration data is generated) indicating that the first smart light bulb is to be turned ON upon the security camera detecting motion.

In a second example, configuration data can be defined for a single device (e.g., as an action device). To illustrate, consider that a smart air quality monitor is added to a user account and connected to a home network. A smart display is already on the home network and registered under the user account. A routine is generated and indicates that the smart display is to present air quality information on a daily basis (e.g., at 8:00 am). Here, the smart display can pull the relevant air quality information from the smart air quality monitor and/or from another information source (e.g., from a weather web server).

In a third example, configuration data can indicate one or more actions executable by multiple devices. Referring to the two smart light bulbs example above, the action is to "turn ON" and is executed by both smart light bulbs upon the activation of the smart doorbell. In another illustration, consider that this routine is defined as also including a smart speaker. A second action is to "play a chime." As such, upon the smart doorbell's activation, not only the two smart light bulbs turned ON, but also the smart speaker plays a chime.

In a fourth example, configuration data can indicate multiple triggers that may be detected by one or more devices. For instance, a routine can involve a motion sensor, a security camera, and a smart display. Two triggers can be defined: motion detected by the motion sensor, and an object being detected in the field of view of the security camera. Only if both triggers are detected, the smart display is activated to present a video feed from the security camera.

In various embodiment described herein, an event is described as initiating an automation procedure by which configuration data is generated. The embodiments similarly and equivalently apply to updating existing configuration data. For instance, upon an event, the definition of any or a combination of a trigger, an action, a trigger device, or an action device can be updated in the configuration data. Referring back to the example of the two smart light bulbs, upon a registration of the smart light bulb under the user account (e.g., an example of an event), the definition of the first routine is updated such that a second action device is identified by the updated. Upon the name change of the first smart light bulb (e.g., another example of an event), the first routine is updated to remove the identifier of the first smart light bulb from the first routine.

Figure 2:
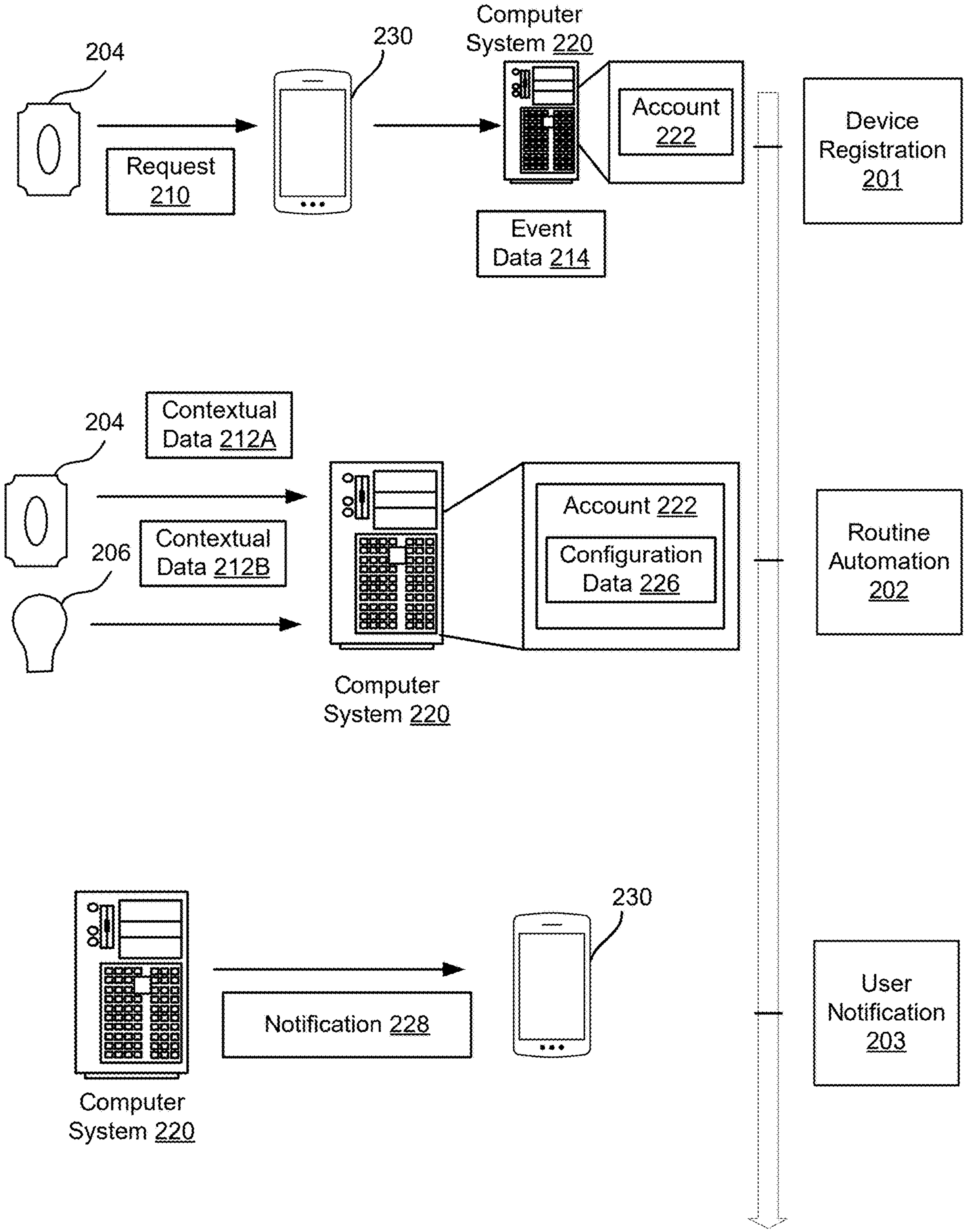
FIG. 2 illustrates an example of stages for action coordination with device registration, according to an embodiment of the present disclosure.

FIG. 2 illustrates an example of stages for action coordination with device registration, according to an embodiment of the present disclosure. As illustrated, the stages include a device registration stage 201, a routine automation stage 202, and a user notification stage 203.

In an example, during the device registration stage 201, a computer system 220, which is an example of the computer system 120 in FIG. 1, receives a request 210 to associate a motion sensor 204 with an account 222. The motion sensor 204 is an example of a new device, whereby the embodiments of the present disclosure equivalently apply to any type of new devices. The request 210 may be received via a user interface of a user device 230 that is associated with the account 222. For instance, the user interface can be a graphical user interface of a mobile application via which a user can login to the user account and provide the request 210 for associating the motion sensor 204 with the account 222. Upon receiving the request 210, the computer system 220 can determine event data 214 that indicates an association of the motion sensor 204 with the account 222 (e.g., the registration).

In an example, during the routine automation stage 202, the computer system 220 determines contextual data 212A associated with the motion sensor 204. The computer system 220 also determines contextual data 212B associated with a smart light 206 that is also associated with the account 222. For example, the contextual data 212A-212B can indicate device names, device locations, device-to-device proximity, device groups, device supported capabilities, or natural language descriptions of device uses. As an example, the contextual data 212A may indicate a device name of "backyard sensor" for the motion sensor 204, and the contextual data 212B may indicate a device name of "backyard light" for the smart light 206. Based on the contextual data 212A-212B (and on permission data indicating a permission to automate device-executable actions), the computer system 220 can generate configuration data 226 associated with automating an action. For instance, based on the motion sensor 204 and the smart light 206 being associated with the account 222 and there being a match between the contextual data 212A-212B (e.g., having the device names "backyard sensor" and "backyard light"), the computer system 220 can determine that the action to automate involves turning the smart light 206 ON upon the motion sensor 204 detecting movement. The trigger is the detection of movement by the motion sensor 204, and the action is the smart light 206 turning ON. So, the configuration data 226 can indicate that the action is to be executed by the smart light 206 upon the trigger being detected by the motion sensor 204. That is, the configuration data 226 can indicate that the smart light 206 is to be turned ON in response to the motion sensor 204 detecting motion. The computer system 220 then associates the configuration data 226 with the account 222.

In an example, during the user notification stage 203, the computer system 220 causes a user interface of the user device 230 to present a notification 228. The notification 228 includes a description of the action and the trigger. The description of the action and the trigger can be generated based on the configuration data 226. The notification 228 may be presented at the user interface in response to an occurrence of the trigger or an execution of the action. For example, the notification 228 may be presented at the user device 230 the first time the action is executed in response to the trigger. Or the notification 228 may be presented at the user device 230 after "N" (e.g., ten) uses of the action in response to the trigger. This notification may be a request for user input for feedback about whether the routine should be kept or removed.

Figure 3:
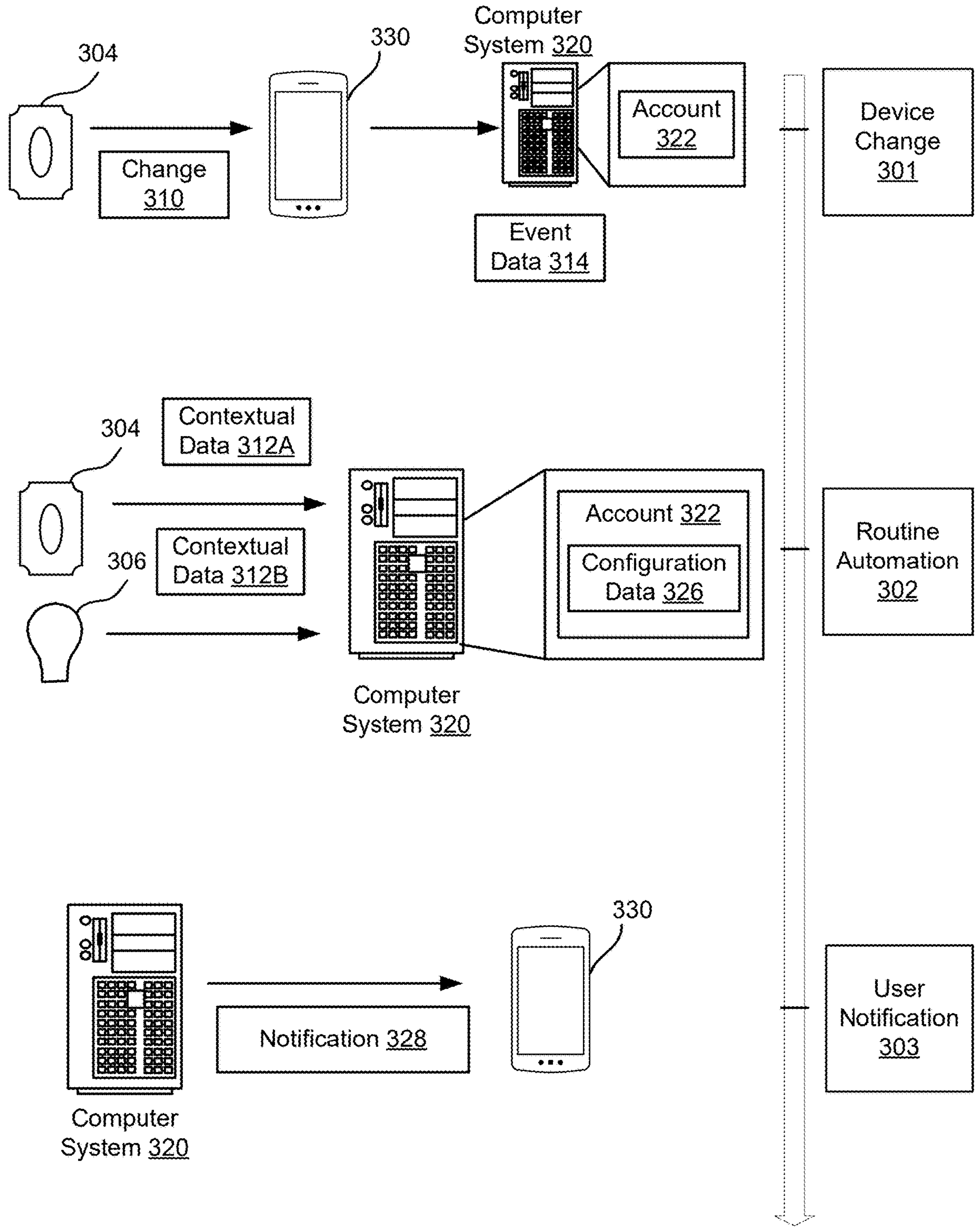
FIG. 3 illustrates an example of stages for action coordination with device change, according to an embodiment of the present disclosure.

FIG. 3 illustrates an example of stages for action coordination with device change, according to an embodiment of the present disclosure. As illustrated, the stages include a device change stage 301, a routine automation stage 302, and a user notification stage 303.

In an example, during the device change stage 301, a computer system 320, which is an example of the computer system 120 in FIG. 1, receives an indication of a change 310 to a motion sensor 304 associated with an account 322. The change 310 may be a change to a context (e.g., a device name, a device location, a device group, etc.) associated with a motion sensor 304 (an example of the motion sensor 204 of FIG. 2). The indication of the change 310 can be received via a user interface of a user device 330 that is associated with the account 322. For instance, the user interface may be a graphical user interface of a mobile application via which a user can provide an indication of the change 310. As an example, the change 310 may be changing the device location from the backyard to the kitchen. Upon the change 310 being completed, the computer system 320 can determine event data 314 that indices the change 310.

In an example, during the routine automation stage 302, the computer system 320 determines contextual data 312A associated with the motion sensor 304. The contextual data 312A is determined based on the change 310. The computer system 220 also determines contextual data 312B associated with a smart light 306 that is also associated with the account 322. For example, the contextual data 312A-312B can indicate the device location of the kitchen for the motion sensor 304 and the smart light 306. Based on the contextual data 312A-312B (and on permission data indicating a permission to automate device-executable actions), the computer system 320 can generate configuration data 326 associated with automating an action. For instance, based on the motion sensor 304 and the smart light 306 being associated with the account 322 and there being a match between the contextual data 312A-312B (e.g., having the same device location), the computer system 320 can determine that the action to automate involves turning the smart light 306 ON upon the motion sensor 304 detecting movement. The trigger is the detection of movement by the motion sensor 304, and the action is the smart light 306 turning ON. So, the configuration data 326 can indicate that the action is to be executed by the smart light 306 upon the trigger being detected by the motion sensor 304. That is, the configuration data 326 can indicate that the smart light 306 is to be turned ON in response to the motion sensor 304 detecting motion. The computer system 320 then associates the configuration data 326 with the account 322.

In an example, during the user notification stage 303, the computer system 320 causes a user interface of the user device 330 to present a notification 328. The notification 328 includes a description of the action and the trigger. The description of the action and the trigger can be generated based on the configuration data 326. In addition, the notification 328 can present a description that the configuration data 326 is associated with the change 310. The notification 328 may be presented at the user interface in response to an occurrence of the trigger, an execution of the action, or a detection of the change 310. For example, the notification 328 may be presented at the user device 330 the first time the action is executed in response to the trigger. Or the notification 328 may be presented at the user device 330 after "N" (e.g., ten) uses of the action in response to the trigger.

Figure 4:
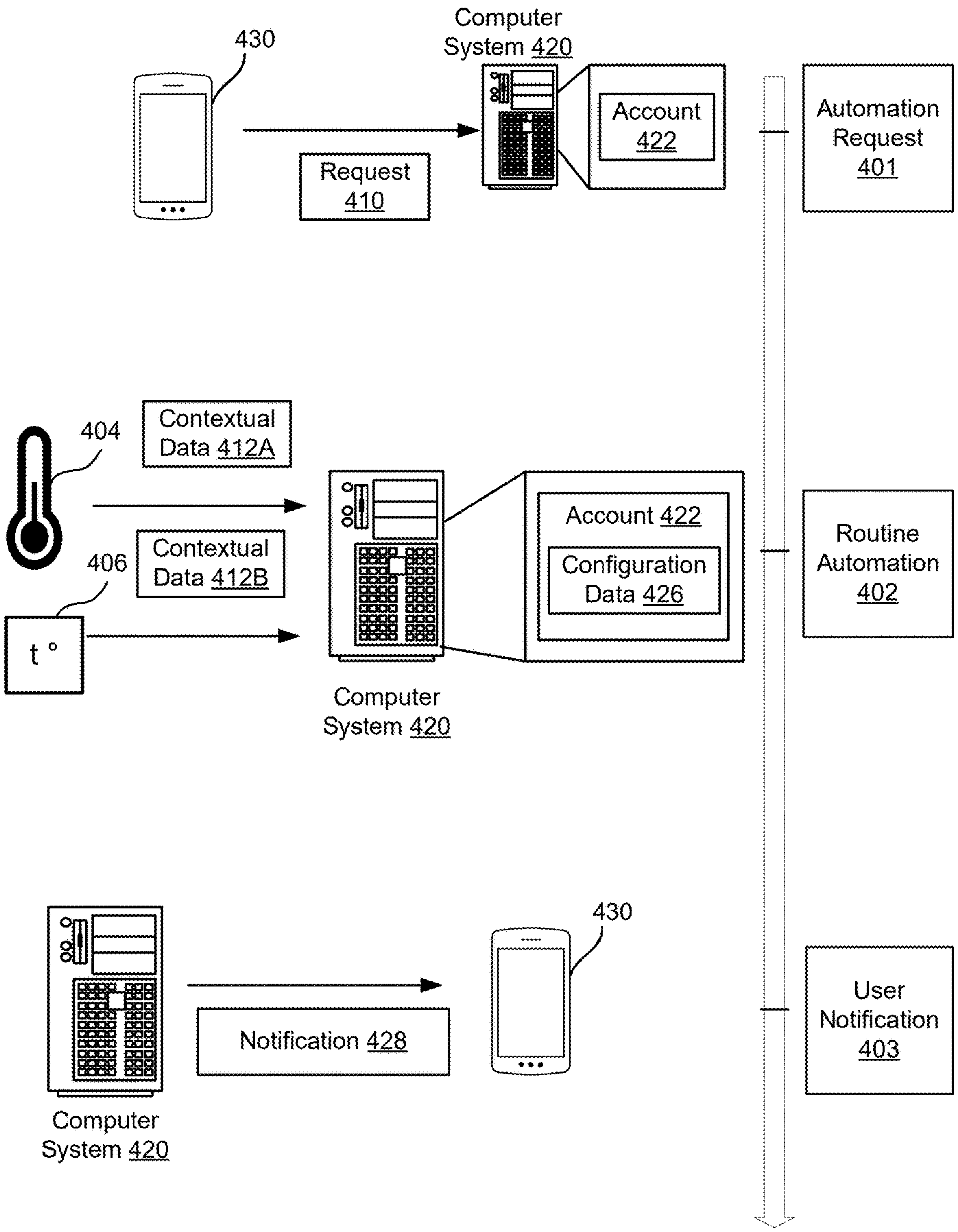
FIG. 4 illustrates an example of stages for action coordination with an automation request, according to an embodiment of the present disclosure.

FIG. 4 illustrates an example of stages for action coordination with an automation request, according to an embodiment of the present disclosure. As illustrated, the stages include an automation request stage 401, a routine automation stage 402, and a user notification stage 403.

In an example, during the automation request stage 401, a computer system 420, which is an example of the computer system 120 in FIG. 1, receives a request 410 to automate one or more device-executable actions. The request 410 can be received via a user interface of a user device 430 that is associated with an account 422. For instance, the user interface may be a graphical user interface of a mobile application via which a user can provide the request 410 for automating device-executable actions. The request 410 need not identify any specific device. Upon receiving the request 410, the computer system 420 can determine device-executable actions for devices that are associated with the account 422.

In an example, during the routine automation stage 402, the computer system 420 determines contextual data 412A associated with a thermometer 404 that is associated with the account 422. The computer system 420 also determines contextual data 412B associated with a thermostat 406 that is also associated with the account 422. For example, the contextual data 412A-412B can indicate device names, device locations, device-to-device proximity (e.g., using RSSI or CSI), device groups, device supported capabilities, or natural language descriptions of device uses. As an example, the contextual data 412A-412B may indicate a received signal strength indicator (RSSI) for the thermometer 404 and the thermostat 406 is −62 dBm. Based on the request 410 and the contextual data 412A-412B (and on permission data indicating a permission to automate device-executable actions), the computer system 420 can generate configuration data 426 associated with automating an action. For instance, based on the thermometer 404 and the thermostat 406 being associated with the account 422 and there being a match between the contextual data 412A-412B and a condition (e.g., having an RSSI greater than −67 dBm), the computer system 420 can determine that the action to automate involves turning the thermostat 406 to a heating mode when the thermometer 404 detects an outdoor temperature below sixty-five degrees Fahrenheit. The trigger is the detection of the temperature below sixty-five degrees Fahrenheit by the thermometer 404, and the action is the thermostat 406 turning to a heating mode. So, the configuration data 426 can indicate that the action is to be executed by the thermostat 406 upon the trigger being detected by the thermometer 404. That is, the configuration data 426 can indicate that the thermostat 406 is to be turned to the heating mode in response to the thermometer 404 detecting the temperature below sixty-five degrees Fahrenheit. The computer system 420 then associates the configuration data 426 with the account 422.

In an example, during the user notification stage 403, the computer system 420 causes a user interface of the user device 430 to present a notification 428. The notification 228 includes a description of the action and the trigger. The description of the action and the trigger can be generated based on the configuration data 426. The notification 428 may be presented at the user interface in response to an occurrence of the trigger or an execution of the action. For example, the notification 428 may be presented at the user device 430 the first time the action is executed in response to the trigger. Or the notification 428 may be presented at the user device 430 after "N" (e.g., ten) uses of the action in response to the trigger.

Figure 5:
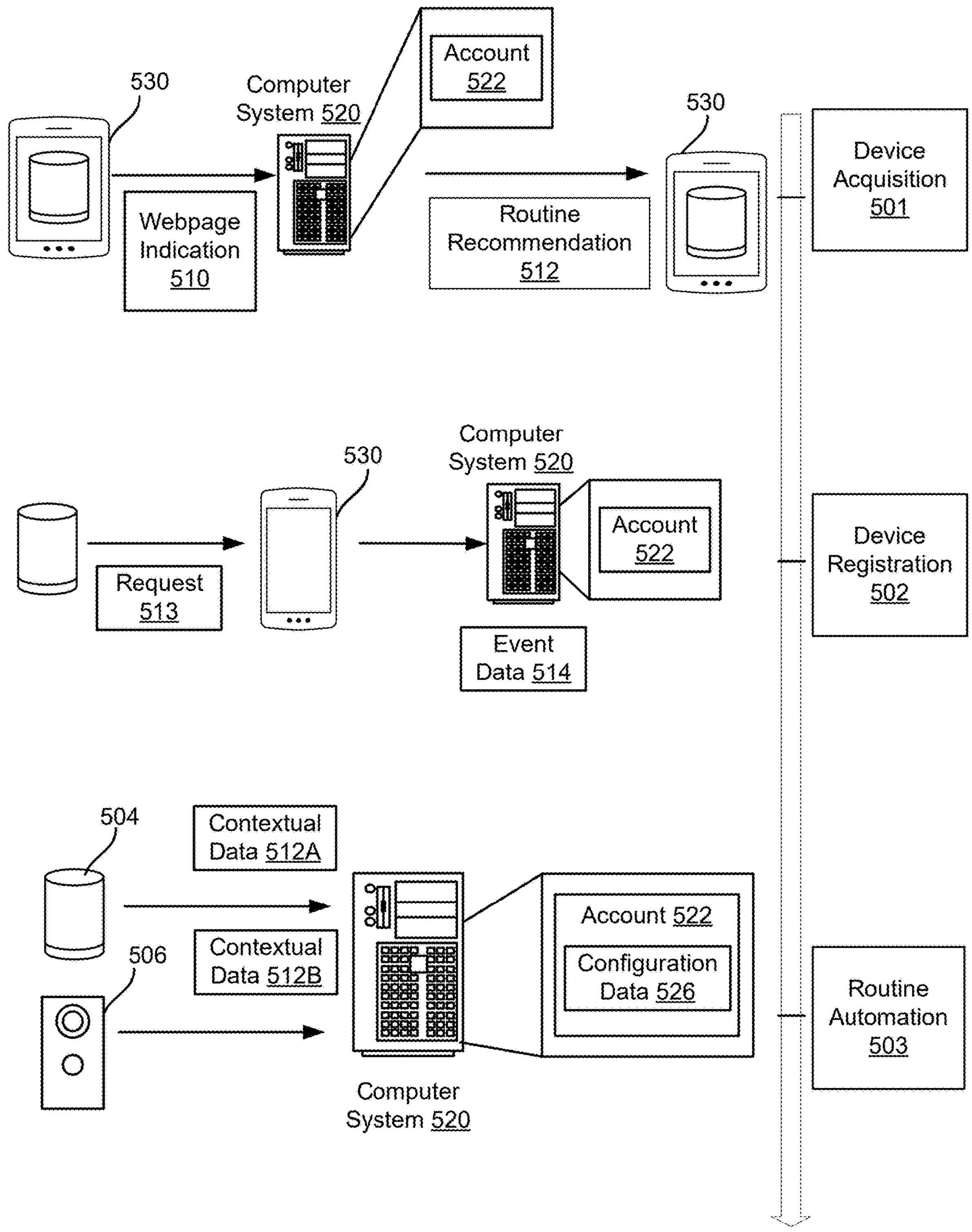
FIG. 5 illustrates an example of stages for action coordination with device acquisition, according to an embodiment of the present disclosure.

FIG. 5 illustrates an example of stages for action coordination with device acquisition, according to an embodiment of the present disclosure. As illustrated, the stages include a device acquisition stage 501, a device registration stage 502, and a routine automation stage 503.

In an example, during the device acquisition stage 501, a computer system 520, which is an example of the computer system 120 in FIG. 1, receives a web page indication 510 indicating that a web page is to be presented via a user interface of a user device 530. For instance, the user interface may present a web page through which a user can obtain a device (e.g., smart speaker 504), such as purchasing the device, replacing an existing device with the device, or redeeming the device using points. The user device 530 is associated with an account 522. Based on the web page indication 510 and the account 522, the computer system 520 can generate a routine recommendation 512. The routine recommendation 512 indicates an action and a trigger. For instance, if the account 522 is also associated with a smart speaker, the routine recommendation 512 can involve an action of the smart speaker 504 outputting audio about someone being at a front door when a smart doorbell is rung. The computer system 520 can cause the user interface to present the routine recommendation 512 in the web page for obtaining the smart speaker 504 such that a description of the action and the trigger is provided at the user interface at the time of the smart speaker 504 being acquired (e.g., purchased).

During the device acquisition stage 501, the computer system 520 determines contextual data 512A associated with the smart speaker 504. The computer system 520 also determines contextual data 512B associated with other devices of the user account 522, such as a smart doorbell 506. For example, the contextual data 512A-512B can indicate device names, device locations, device-to-device proximity, device groups, device supported capabilities, or natural language descriptions of device uses. Based on the contextual data 512A-512B, the computer system 520 can determine an action that can be automated and the related trigger and can include information about this action and trigger in the routine recommendation 512.

In an example, during the device registration stage 502, the computer system 520 receives a request 513 to associate the smart speaker 504 with the account 522. The request 513 can be received via a user interface of the user device 530 that is associated with the account 522. Based on the request 513, the computer system 520 can determine event data 514 that indicates an association of the smart speaker 504 with the account 522.

In an example, during the routine automation stage 503, the computer system 520 can generate configuration data 526 that defines the action and the trigger of the routine recommendation 512. The computer system 520 can do so based on the smart speaker 504 being now associated with the account 522 and permission data indicating that the corresponding routine can be automatically created. This permission data can be received via the user interface during the device acquisition stage 501, during the device registration stage 502, or during the routine automation stage 503. Alternatively, the configuration data 526 can be generated anew by determining the contextual data 512A associated with the smart speaker 504 and the contextual data 512B associated with the smart doorbell 506 during the routine automation stage 503. Here also, the contextual data 512A-512B can indicate device names, device locations, device-to-device proximity, device groups, device supported capabilities, or natural language descriptions of device uses. As an example, the contextual data 512A-512B may also indicate an approval of the routine recommendation 512 that was received via the user interface during the device acquisition stage 501. So, based on the contextual data 512A-512B (and on permission data indicating a permission to automate device-executable actions), the computer system 520 can generate the configuration data 526 associated with automating the action. In both cases, upon the configuration data 526 being generated, the computer system 520 associates the configuration data 526 with the account 522. The computer system 520 can also cause a user interface of the user device 530 to present a notification 528 describing the action and the trigger.

Although aspects herein are described with respect to web sites and web pages for clarity, embodiments of the present disclosure generally relate to network resources and network documents. A web site is an example of a network resource, whereas a web page is an example of a network document. In this use case of a web site and web pages, the network resource includes a collection of network documents and related underlying computing infrastructure that enables the hosting of the network documents on a set of web servers and the browsing, searching, searching, and/or downloading from the set of server servers of such network documents to user devices executing web browsers. In an example, a network resource enables the browsing, searching, searching, and/or downloading of network documents using other technologies, such as mobile application technologies. Here, a mobile application (e.g., other than a web browser) can execute on a user device to access, via an application programming interface (API) call, a page (e.g., an example of a network document) from a server (which need not be a web server), where the server can store a set of pages that represent a front end of the network resource. In both of these examples, a network document can be downloaded to a user device by sending code (e.g., HTML code) of the network document to the user device. The code can be dynamically generated upon a request from the user device. For example, a network resource may be a mobile application that runs on a device.

Figure 6:
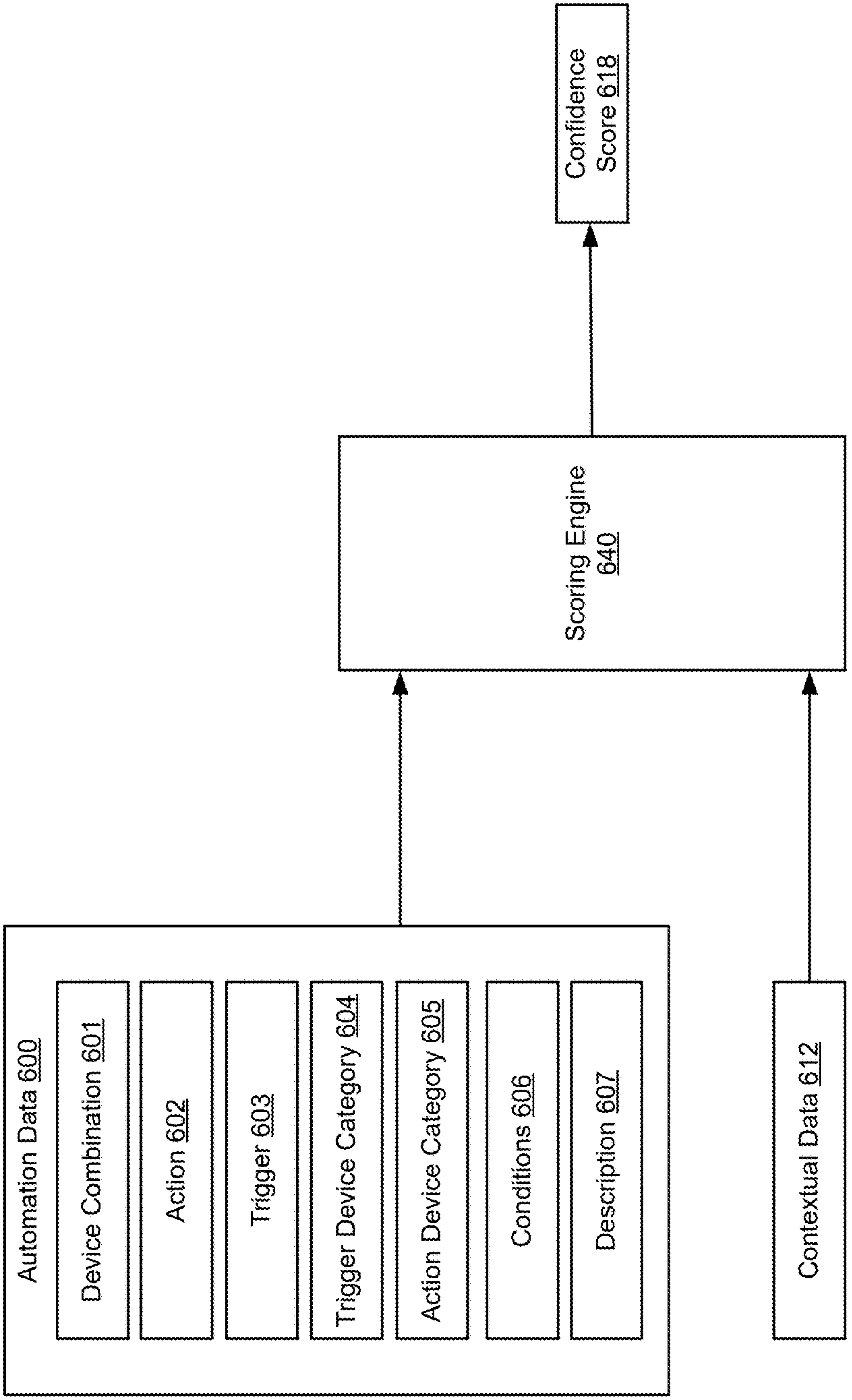
FIG. 6 illustrates an example of automation data and contextual data for action coordination, according to an embodiment of the present disclosure.

FIG. 6 illustrates an example of automation data and contextual data for action coordination, according to an embodiment of the present disclosure. A scoring engine 640, which may be part of computer system 120 in FIG. 1, can receive automation data 600 and contextual data 612 to determine a confidence score 618 associated with generating configuration data for automating an action. The automation data 600 can be organized in a specific data structure, saved as a set of files with a specific set of file extensions, and considered as a blueprint for determining whether to generate configuration data for an action. When there is an event associated with devices of an account, such as a new device being registered with an account, a change occurring to a device associated with the account, or a request for actions to be automated, automation data for various device combinations is determined. For instance, automation data 600 may include a device combination 601 of a first device (e.g., a camera) and a second device (e.g., a display device).

In an example, a data store (not shown in FIG. 6), such as a database, stores automation data for possible combination of device types. The storage can take the form of a key-value pair. The key can include the combination of device types (e.g., as a string). The value can include fields similar to the ones described in FIG. 6. For a combination of two devices, the scoring engine 604 can generate a string corresponding to the combination of the device types and use this string in a query of the data store. The corresponding fields are returned.

In an example, the automation data 600 defines an action 602, a trigger 603 for the action 602, a trigger device category 604, an action device category 605, conditions 606, and a description 607. For the device combination 601 of the camera and the display device, the action 602 can be presenting video from the camera at the display device. The trigger 603 may be the camera detecting motion. The trigger device category 604 may be a category and/or a capability set of devices usable to detect the trigger 603. For instance, the trigger device category 604 may be a device location, a device-to-device proximity, a device group, a device supported capability, a type of devices, particular device models, particular original equipment manufacturer (OEM) devices, etc. The action device category 605 can be a category and/or capability of devices usable to execute the action 602. For instance, the action device category 605 may be a device location, a device-to-device proximity, a device group, a device supported capability, a type of devices, particular device models, particular original equipment manufacturer (OEM) devices, etc. The conditions 606 may include conditions that are to be met to determine an intended use of a device and/or automatically generate configuration data for the action 602. The conditions 606 can specify different signals (e.g., types of information) that are to be collected to determine the intent and/or whether to generate the configuration data. In an example, at least a subset of the conditions 606 (or all the conditions 606) need to be met to determine that the device is intended to be used in a particular way. The intended use can correspond to how the device is to be used as a standalone device and/or in association with the user account (such as by coordinating event detection and action execution with one or more other devices associated with the user account). The configuration data can be predefined to correspond to the intended use. In another example, the conditions 606 may not be correlated to an intended use and may, instead, correlate directly to the configuration data. The description 607 may include a natural language description that is to be presented at a user interface to describe the action 602 and the trigger 603.

In addition to the automation data 600, the scoring engine 640 can receive contextual data 612 for each of the devices associated with the device combination 601. Generally, the contextual data 612 correspond to the conditions 606 (e.g., to signals that are to be collected, such that the conditions 606 can be checked). In the case the camera-display device pair, the contextual data 612 relates to the camera and the display device. The contextual data 612 for each of the devices indicates at least one of: a device type, a device identifier, and/or how the device is to be used. For instance, the contextual data 612 can include the device type, the device identifier, a device name, a device location, a device-to-device proximity, a device group, a device supported capability, and/or a natural language description of device use. Based on the automation data 600 and the contextual data 612, the scoring engine 640 can determine a number of the conditions 606 that are met (e.g., the subset of the conditions 606 or the full set of the conditions 606 that are met). For instance, the conditions 606 may indicate that the devices are to belong to a same device group and have an RSSI greater than −70 dBm. If for the device combination 601, the contextual data 612 indicates that the camera and the display device belong to the same device group, but they have an RSSI of −75 dBm, then the scoring engine 640 determines that one of the two conditions is met. Based on the number of the conditions 606 that are met (e.g., the particular conditions in the subset and/or the size of the subset), the scoring engine 640 determines the confidence score 618 associated with generating the configuration data. For instance, the confidence score 618 may be a ratio of the number of the conditions 606 that are met to the total number of the conditions 606. Thus, if all the conditions 606 are met, the confidence score 618 is one, if one of two of the conditions 606 are met, the confidence score 618 is 0.5, and so on.

In an example, the computer system may compare the confidence score 618 to a threshold to determine whether to generate the configuration data. If the confidence score 618 is larger than the threshold, then the computer system can generate configuration data associated with the automation data 600. Otherwise, the computer system may forgo generating configuration data that is associated with the automation data 600. In some instances, the computer system may compare the confidence score 618 to an upper threshold score and a lower threshold score. If the confidence score 618 is smaller than the upper threshold score but larger than the lower threshold score, the computer system may cause a user interface to present notification associated with generating the configuration data (e.g., a routine recommendation can be presented). The notification can include a request for a user to indicate whether the configuration data is to be generated or not (e.g., whether the corresponding routine is to be generated).

The computer system can also use the automation data 600 to determine which device is to detect the trigger 603 and which device is to execute the action 602. Particularly, the computer system can determine a match between a candidate device and the trigger device category 604 to then indicate that this candidate device is set as a trigger device. Similarly, the computer system can determine a match between a candidate device and the action device category 606 to then indicate that this candidate device is set as an action device. For instance, for the action 602 of presenting video and the trigger 603 being detecting motion, the camera can be determined to be the device for detecting the trigger 603 based on the camera being capable of detecting motion. The display device can be determined to be the device for executing the action 602 based on the display device being capable of displaying video content. So, upon determining that the configuration data is to be generated, the computer system can generate the configuration data to indicate that the camera is to detect the trigger 603 and that the display device is to execute the action 602.

In some embodiments, the automaton data 600 can be defined as a JavaScript object notation (JSON) object. An example of a JSON object is as following:

```
{
"automationdataId": " ", "
friendlyDescription": " ",
"triggerDevices": [[{
  "serial numbers": [ ],
  "deviceTypes": [ ],
  "capabilities": [ ],
  "applicationId": [ ],
  "deviceCategory": [ ],
    }]
"contextualdata": [ ],
"actionDevices": [{
  "serial numbers": [ ],
  "deviceTypes": [ ],
  "capabilities": [ ],
  "applicationId": [ ],
  "deviceCategory": [ ],
  "automations": [{
    "triggers": [ ],
    "conditions": [ ],
    "actions": [ ]
    }]
  }
]}
```

In the above example, the automationdataId can be a universal unique identifier for the automation data 600. The friendlyDescription can be a user-friendly description of the automation data 600, where this description can be surfaced to a user interface. The triggerDevices can be an array of objects that identifies a list of devices that can be used to detect one or more triggers (e.g., trigger devices). The serial number for the triggerDevices can be identification numbers of the trigger devices. The deviceTypes for the triggerDevices can be an identifier of a device type where available (e.g., its category). The capabilities for the triggerDevices can indicate capabilities that may be used to identify the trigger devices. The applicationId for triggerDevices can indicate an application of the trigger devices if available. The contextualdata can indicate properties that need to be true for automation to be created. The actionDevices can be an array of objects that identifies a list of devices that can be used as a target. The skillID for the targetDevices contains a skill of the device if available. The serial number for the actionDevices can be identification numbers of the action devices. The deviceTypes for the actionDevices can be an identifier of a device type where available (e.g., its category). The capabilities for the actionDevices can indicate capabilities that may be used to identify the action devices. The applicationId for actionDevices can indicate an application of the action devices if available. Automations for actionCevices can indicate what automations are possible. Triggers for the automations can indicate trigger events that need to be detected. The conditions for the automations indicate conditions for the automation (e.g., time of day, which are also examples of trigger events). The actions for the automations indicate the actions that are performed by the target device for the automations.

To illustrate, a JSON object may be defined for an automation between an air quality monitor and an air purifier. The automatinodataId can be "IAQI01", and the friendlyDescription can be "Indoor air quality improvement". The triggerDevicea can indicate an air quality monitor and the capabilities for the triggerDevices can indicate a temperature sensor, a humidity sensor, an indoor air quality score range controller, a volatile organic compounds range controller, a particulate matter range controller, and a carbon monoxide range controller. The actionDevices can identify an air purifier with capabilities of power control, mode control, and speed control. The contextualdata can indicate that the triggerDevices and the actiontDevices are to be co-located. The automations can then indicate a first trigger of the air quality monitor detecting particulate matter greater than thirty-five μg/m3 and a first action of turning the air purifier on, setting the mode to manual, and the fan speed to medium. The automations can also indicate a second trigger of the air quality monitor detecting particulate matter less than five μg/m3 and a second action of turning the air purifier off.

In an example, once an automation is configured, when a trigger device state change occurs (e.g., change to an amount of particulate matter detected by air quality monitor), the computer system can then determine that a trigger event (e.g., air quality monitor detects particulate matter above thirty-five μg/m3), and send instructions or commands to control the action device (e.g., air purifier). In another example, the commands may be sent to a server associated with managing the action device and/or a cloud computing service, which then sends the commands to the action device. The commands cause the action device to perform an action (e.g., turn on air purifier, set mode to manual, and set fan speed to medium).

In FIG. 6, a scoring engine 640 is described. However, embodiments of the present disclosure are not limited as such. For instance, a matching engine can be implemented instead. More particularly, the conditions 606 can indicate that the contextual data 612 for different devices need to match for a corresponding routine to be generated. The matching engine can compare the contextual data 612 to determine whether matches exist. If all the matches are found, the matching engine can output an indication that the conditions 606 are met, thereby triggering the routine generation. Otherwise, the matching engine can indicate that the routine is not to be generated. To illustrate, consider the following. The conditions 606 can indicate that device proximities and device groups have to be satisfied. The contextual data 612 of two devices can indicate that they are in proximity to each other and that they belong to a same device group. In this case, the matching engine can output the indication that the conditions 606 are satisfied.

Figure 7:
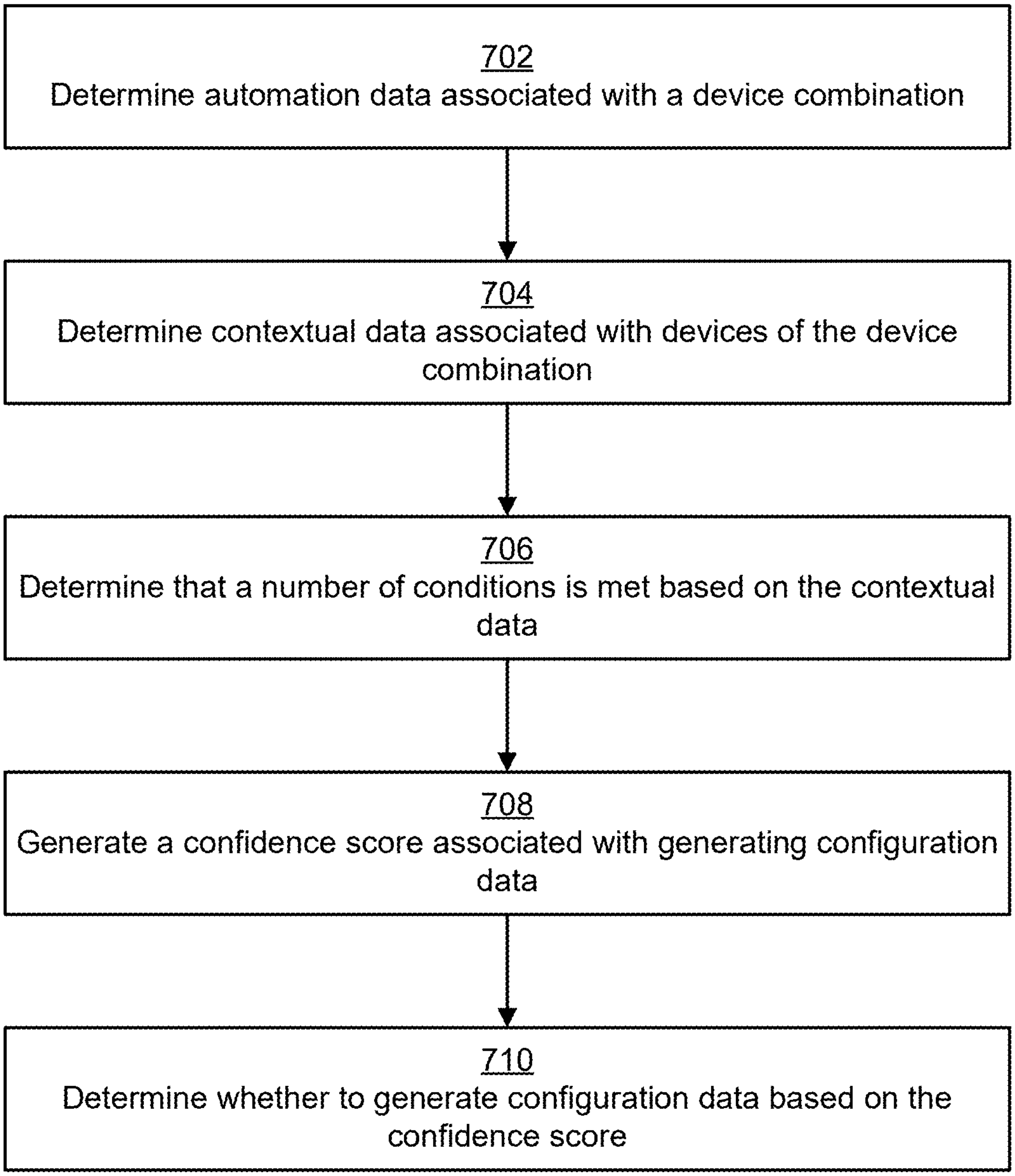
FIG. 7 illustrates an example of a flow for a process of using automation data and contextual data for action coordination.
Figure 8:
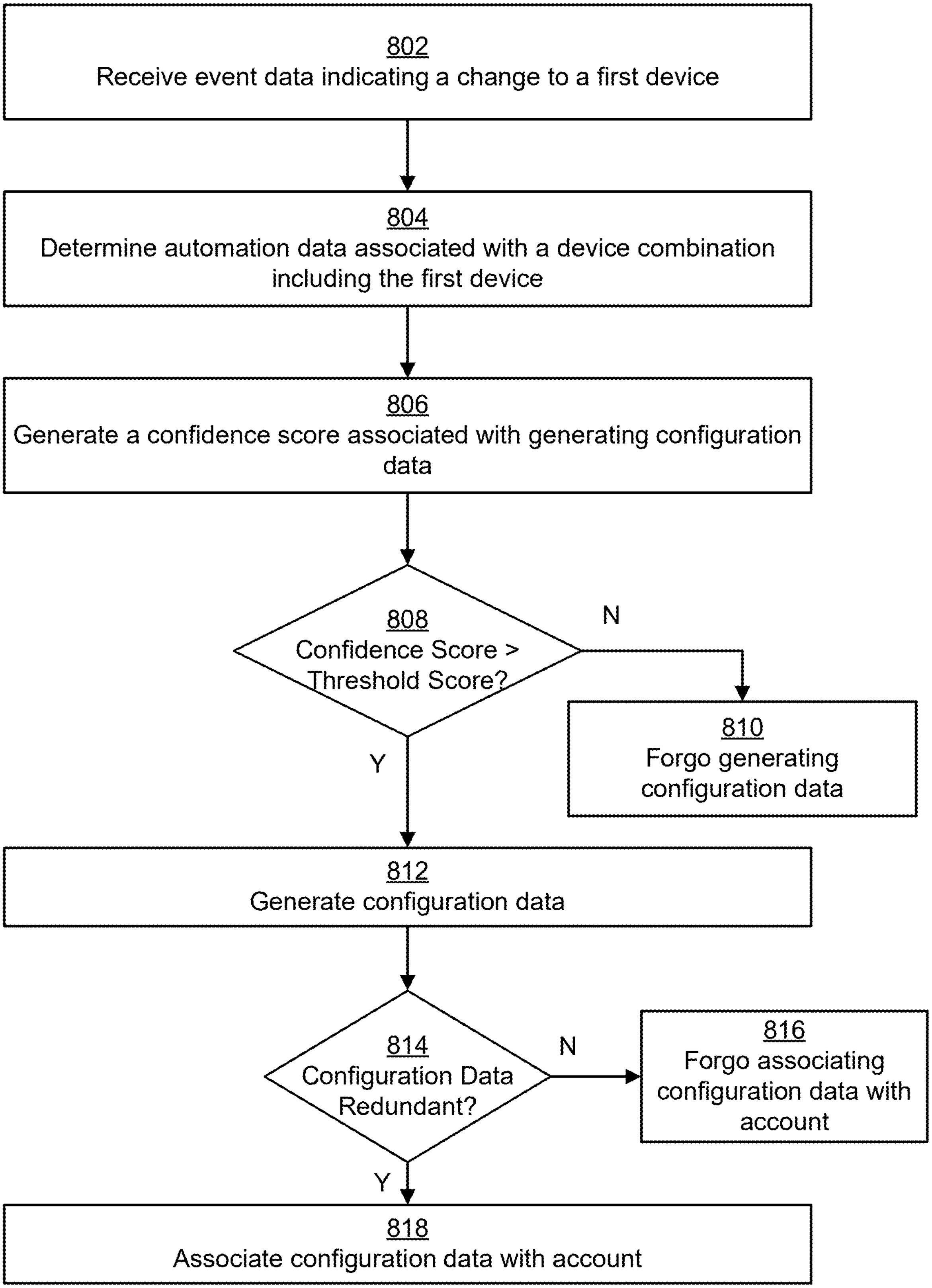
FIG. 8 illustrates an example of a flow for a process of using automation data and contextual data for action coordination based on a device change.

FIGS. 7-8 illustrate example flows for using automation data for configuration data generation. Instructions for performing the operations can be stored as computer-readable instructions on one or more non-transitory computer-readable media of a computer system (e.g., computer system 120 in FIG. 1). As stored, the instructions represent programmable modules that include code executable by one or more processors of the computer system. The execution of such instructions causes the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 7 illustrates an example of a flow for a process of using automation data and contextual data for action coordination. In an example, the flow includes operation 702, where the computer system determines automation data associated with a device combination. The device combination includes a first device and a second device. The automation data indicates an action, a trigger, a first category for devices to detect the trigger, a second category of devices to execute the action, and conditions to be met to generate configuration data associated with the action.

In an example, the flow includes operation 704, where the computer system determines contextual data associated with the devices of the device combination. The contextual data for each device includes at least one of: a device name, a device location, a device-to-device proximity, a device group, a device supported capability, or a natural language description of device use. The contextual data may be collected based on the conditions that are to be met.

In an example, the flow includes operation 706, where the computer system determines that a number of conditions is met based on the contextual data. The computer system may determine a condition is met based on determining a match between contextual data for the first device and the second device.

In an example, the flow includes operation 708, where the computer system generates a confidence score associated with generating configuration data. The confidence score is based on the number of conditions that are met and the total number of conditions indicated in the automation data.

In an example, the flow includes operation 710, where the computer system determines whether to generate configuration data based on the confidence score. The computer system can compare the confidence score to a threshold score. If the confidence score exceeds the threshold score, the computer system can generate the configuration data. If the confidence score is below the threshold score, the computer system can perform additional processing before generating the configuration data (e.g., causing a presentation of a routine recommendation and request to confirm that the corresponding routine is to be generated), or forgo generating the configuration data altogether.

FIG. 8 illustrates an example of a flow for a process of using automation data and contextual data for action coordination based on a device change. In an example, the flow includes operation 802, where the computer system receives event data indicating a change to a first device. The first device is associated with an account. The change may be a change to a device name, a device group, a device location, a device supported capability, and the like.

In an example, the flow includes operation 804, where the computer system determines automation data associated with a device combination including the first device. The device combination also includes a second device associated with the account. The automation data indicates an action, a trigger, a first category for devices to detect the trigger, a second category of devices to execute the action, and conditions to be met to generate configuration data associated with the action.

In an example, the flow includes operation 806, where the computer system generates a confidence score associated with generating configuration data. The computer system can determine contextual data associated with the devices of the device combination. The contextual data for each device includes at least one of: a device name, a device location, a device-to-device proximity, a device group, a device supported capability, or a natural language description of device use. The contextual data may be collected based on the conditions that are to be checked. The computer system can determine that the contextual data indicates that a number of conditions is met and generate the confidence score based on the number of conditions that are met.

In an example, the flow includes operation 808, where the computer system determines whether the confidence score is greater than a threshold score. The computer system compares the confidence score to the threshold score to determine whether the confidence score is greater than the threshold score. If the confidence score is greater than the threshold score, the flow proceeds to operation 812. Otherwise, the flow proceeds to operation 810.

In an example, the flow includes operation 810, where the computer system forgoes generating configuration data. Here, if the confidence score is compared to a lower threshold and an upper threshold, operation 810 can be performed only if the confidence score is smaller than the lower threshold.

In an example, the flow includes operation 812, where the computer system generates configuration data. The configuration data is associated with automating the action. The configuration data indicates that the action is to be executed by one of the first device or the second device upon a trigger being detected by the other one of the first device or the second device.

In an example, the flow includes operation 814, where the computer system determines whether the configuration data is redundant. The computer system determines whether the configuration data is different from other configuration data already associated with the account (whether the same action, same trigger, same action device, and same trigger device are already identified in a routine associated with the account). If the configuration data is different, the flow proceeds to operation 818. Otherwise, the flow proceeds to operation 816.

In an example, the flow includes operation 816, where the computer system forgoes associating the configuration data with the account. Here, the computer system need not save the routine for the account. Referring back to possibly recommending the routine based on the outcome of the confidence score-threshold comparison, the computer system can also forego recommending the routine because this routine already exists.

In an example, the flow includes operation 818, where the computer system associates the configuration data with the account. For instance, the action, trigger, action device, and trigger device are identified in a configuration that is stored as a file, where the file references the account (e.g., includes an identifier of this account) and is protected based on the account (e.g., encrypted with a key associated with the account).

Figure 9:
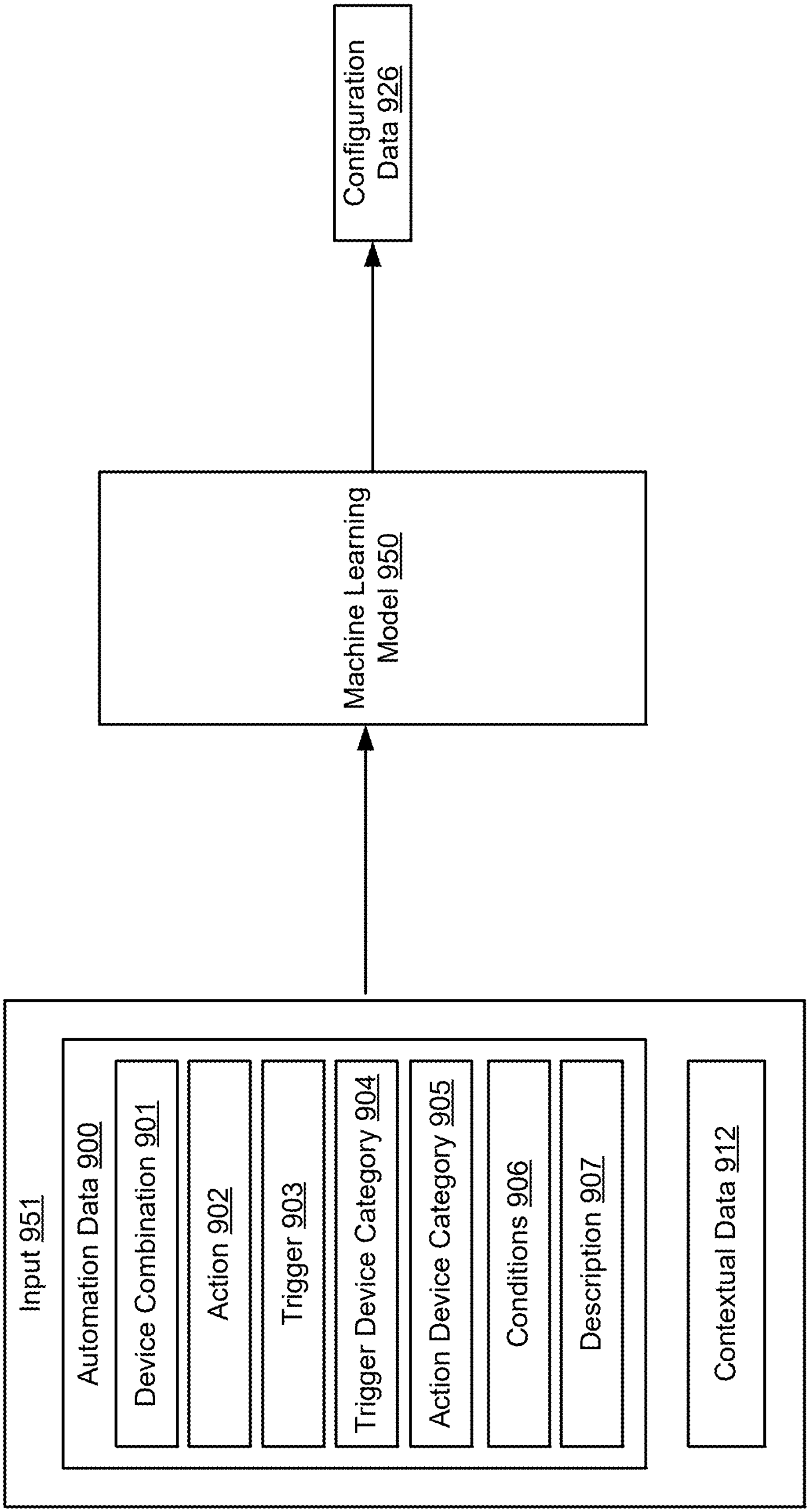
FIG. 9 illustrates an example of automation data and contextual data for action coordination using a machine learning model, according to an embodiment of the present disclosure.

FIG. 9 illustrates an example of automation data and contextual data for action coordination using a machine learning model, according to an embodiment of the present disclosure. A computer system (e.g., computer system 120 in FIG. 1) can determine automation data 900 and contextual data 912 associated with a device combination 901. The automation data 900 can be associated with generating configuration data for automating an action. When there is an event associated with devices of an account, such as a new device being registered with an account, a change occurring to a device associated with the account, or a request for actions to be automated, automation data 900 for various device combinations is determined. For instance, automation data 900 may include device combination 901 of a first device (e.g., an air purifier) and a second device (e.g., a thermostat fan).

In an example, the automation data 900 is retrieved from a data store as described herein above and defines an action 902, a trigger 903 for the action 902, a trigger device category 904, an action device category 905, conditions 906, and a description 907. For the device combination 901 of the air purifier and the thermostat fan, the action 902 can be turning the thermostat fan on. The trigger 903 can be the air purifier detecting particulate matter above a threshold. The trigger device category 904 can be a category or capability of devices that need to detect the trigger 903. For instance, the trigger device category 904 may include a device location, a device-to-device proximity, a device group, a device supported capability, a device use, etc. The action device category 905 can be a category or capability of devices that need to execute the action 902. For instance, the action device category 905 may include a device location, a device-to-device proximity, a device group, a device supported capability, a device use, etc. The conditions 906 are conditions that are to be met to create configuration data for the action 902. The conditions 906 can specify different signals that are to be collected to determine whether to generate the configuration data. The description 907 is a natural language description that is to be presented at a user interface to describe the action 902 and the trigger 903.

In addition to the automation data 900, the computer system also determines contextual data 912 for each of the devices associated with the device combination 901. So, the contextual data 912 can be associated with the air purifier and the thermostat fan. The contextual data 912 for each of the devices indicates at least one of: a device type, a device identifier, and/or how the device is to be used. For instance, the contextual data 912 can include the device type, the device identifier, a device name, a device location, a device-to-device proximity, a device group, a device supported capability, or a natural language description of device use.

In an example, the computer system uses a machine learning model 950 that is trained to generate intent data and/or configuration data based on automation data and contextual data. The intent data can indicate an intent to use a device in a particular way (e.g., how the device is to be used as a standalone device and/or in association with the user account (such as by coordinating event detection and action execution with one or more other devices associated with the user account)). The machine learning model 950 may be a recurrent neural network, a convolutional neural network, a linear regression model, a decision tree, or any other suitable machine learning model. Training the machine learning model 950 can involve using training data of automation data and contextual data, with intent data and/or configuration data labeled as the ground truth. During the training, the machine learning model 950 is fed the automation data and contextual data and predicts the intent data and/or configuration data. The prediction is compared to the label and parameters of the machine learning model 950 are updated to minimize a loss function based on the comparison. Once the machine learning model 950 is trained, its parameters are frozen and stored as program code or a configuration file usable by the computer system.

In an example, post-training, the computer system generates an input 951 to the machine learning model 950 that includes the automation data 900 and the contextual data 912 for each of the devices. The computer system determines an output of the machine learning model 950 that corresponds to the input 951 and indicates the configuration data 926. The configuration data 926 indicates that the action 902 is to be executed by one of the devices of the device combination 901 upon the trigger 903 being detected by the other one of the devices of the device combination 901. For instance, the configuration data 926 can indicate that the thermostat fan is to be turned on in response to the air purifier detecting particulate matter above the threshold. The computer system can then associate the configuration data 926 with the account and automate the action 902 by implementing the configuration data 926 for the account. The output may also indicate a confidence score for generating the configuration data 926, similar to the confidence score 618 in FIG. 6. Additionally, or alternatively, the output may include intent data indicated an intended use of a device. Rather than outputting the configuration data 926, similar configuration data can be predefined to correspond to the intended use.

Figure 10:
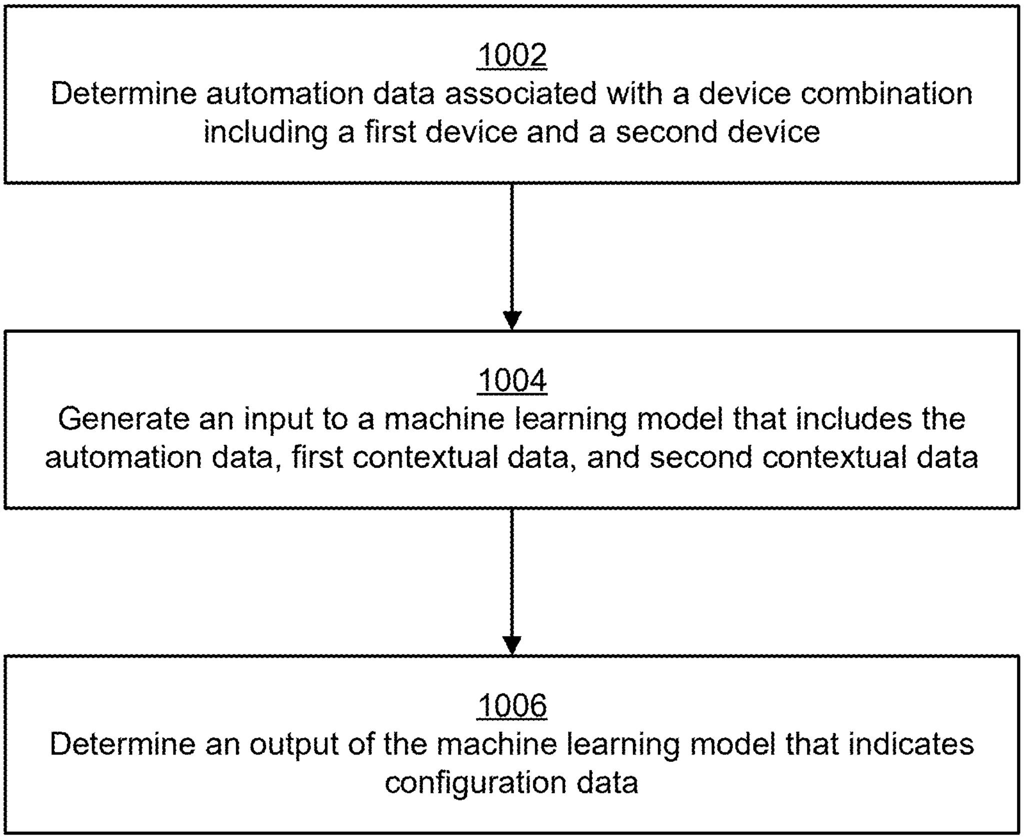
FIG. 10 illustrates an example flow for using automation data and a machine learning model for configuration data generation.

FIG. 10 illustrates an example flow for using automation data and a machine learning model for configuration data generation. Instructions for performing the operations can be stored as computer-readable instructions on one or more non-transitory computer-readable media of a computer system (e.g., computer system 120 in FIG. 1). As stored, the instructions represent programmable modules that include code executable by one or more processors of the computer system. The execution of such instructions causes the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

In an example, the flow includes operation 1002, where the computer system determines automation data associated with a device combination including a first device and a second device. The first device and the second device are associated with an account. The automation data indicates an action, a trigger, a first category for devices to detect the trigger, a second category of devices to execute the action, and conditions to be met to generate configuration data associated with the action.

In an example, the flow includes operation 1004, where the computer system generates an input to a machine learning model that includes the automation data, first contextual data, and second contextual data. The first contextual data is associated with the first device and the second contextual data is associated with the second device. The first contextual data and the second contextual data indicate at least one of: a device name, a device location, a device-to-device proximity, a device group, a device supported capability, or a natural language description of device use. The contextual data may be collected based on the conditions that are to be checked.

In an example, the flow includes operation 1006, where the computer system determines an output of the machine learning model that indicates configuration data. The configuration data is associated with automating the action. The configuration data indicates that the action is to be executed by one of the first device or the second device upon a trigger being detected by the other one of the first device or the second device. Thereafter, the computer system 1006 can associate the configuration data with the account.

Figure 11:
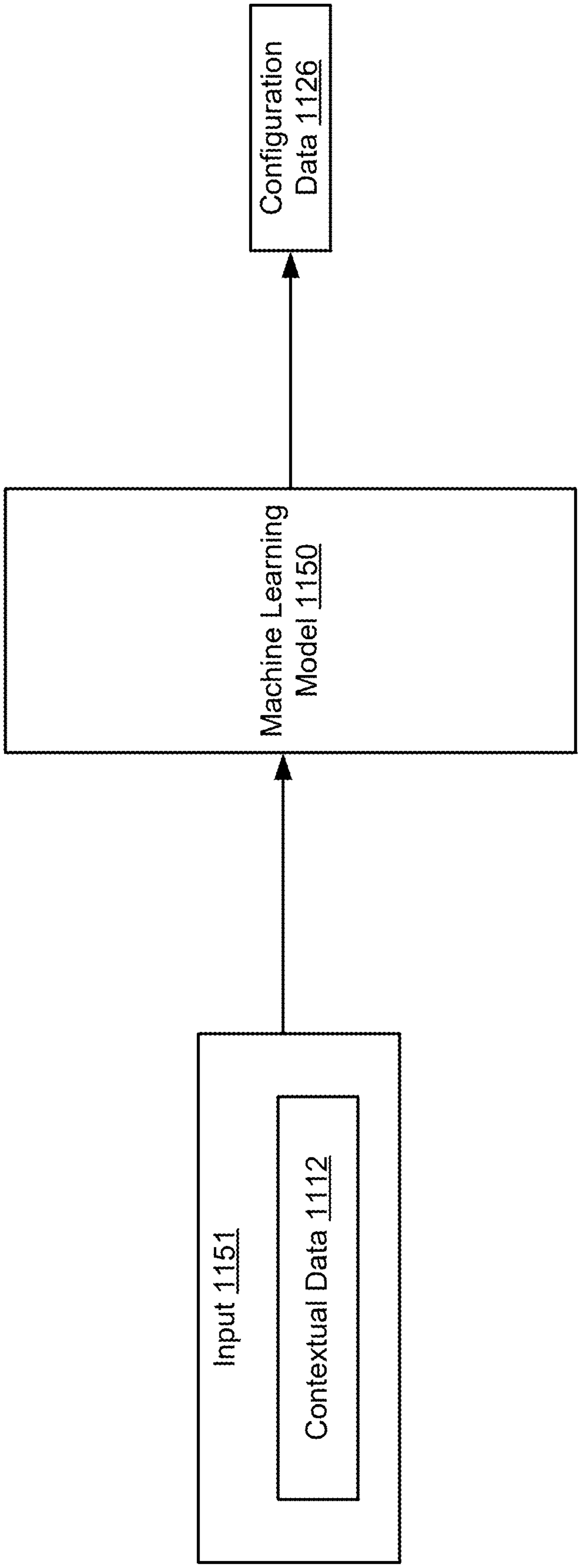
FIG. 11 illustrates an example of contextual data for action coordination using a machine learning model, according to an embodiment of the present disclosure.

FIG. 11 illustrates an example of contextual data for action coordination using a machine learning model, according to an embodiment of the present disclosure. A computer system (e.g., computer system 120 in FIG. 1) can determine contextual data 1112 associated with a device combination. When there is an event associated with devices of an account, such as a new device being registered with an account, a change occurring to a device associated with the account, or a request for actions to be automated, the contextual data 1112 for devices of various device combinations is determined. For instance, a device combination may include a first device (e.g., an air quality monitor) and a second device (e.g., a humidifier). So, the contextual data 1112 can be associated with the air quality monitor and the humidifier. The contextual data 1112 for each of the devices indicates at least one of: a device type, a device identifier, and/or how the device is to be used. For instance, the contextual data 1112 can include the device type, the device identifier, a device name, a device location, a device-to-device proximity, a device group, a device supported capability, or a natural language description of device use.

In an example, in addition to the contextual data for each of the devices, the contextual data 1112 can also indicate a history of automating device-executable actions. For instance, the contextual data 1112 may indicate how a different air quality monitor and humidifier associated with the account performed automated device-executable actions. In addition, the history of automating device-executable actions can indicate what configurations already exist for the account, what configurations are not used, what configurations have been deleted, how each device is used, how often each device is used, etc. The contextual data 1112 can include any user input that may be received by the computer system describing how the user intends to use a device. The contextual data 1112 can also relate to the account, such as a routine usage history, past user interactions with or user inputs at devices associated with the account, timings of and sequences between such user interactions or user inputs, the types of requested or executed actions, and the like.

In an example, the computer system uses a machine learning model 950 that is trained to generate intent data/or configuration data based on automation data and contextual data. The intent data can indicate an intent to use a device in a particular way. The machine learning model 1150 may be a large language model (LLM) or any other suitable machine learning model. Training the machine learning model 1104 can involve using a pre-trained large language model and fine-tuning the pre-trained large language model using training data of contextual data, with intent data and/or configuration data labeled as the ground truth. The training data can also include automation data previously defined (e.g., existing blueprints). During the fine tuning, the machine learning model 1150 is fed the contextual data and predicts the training data and/or configuration data. The prediction is compared to the label and parameters of the machine learning model 1150 are updated to minimize a loss function based on the comparison.

In an example, post training, the computer system generates an input 1151 to the machine learning model 1150 that includes the contextual data 1112 for each of the devices and the history of automating device-executable actions. The computer system determines an output of the machine learning model 1150 that corresponds to the input 1151 and indicates the configuration data 1126. The configuration data 1126 indicates that an action is to be executed by one of the devices of the device combination upon a trigger being detected by the other one of the devices of the device combination. For instance, the configuration data 1126 can indicate that the humidifier is to be turned on in response to the air quality monitor detecting a humidity above a threshold. The computer system can then associate the configuration data 1126 with the account and automate the action 1102 by implementing the configuration data 1126 for the account. Additionally, or alternatively, the output may include intent data indicated an intended use of a device. Rather than outputting the configuration data 1126, similar configuration data can be predefined to correspond to the intended use.

Because the machine learning model 1150 receives the history of automating device-executable actions, before generating the configuration data 1126 the machine learning model 1150 can determine whether a same configuration already exists. If so, the machine learning model 1150 forgoes generating the configuration data 1126 for a redundant configuration.

Figure 12:
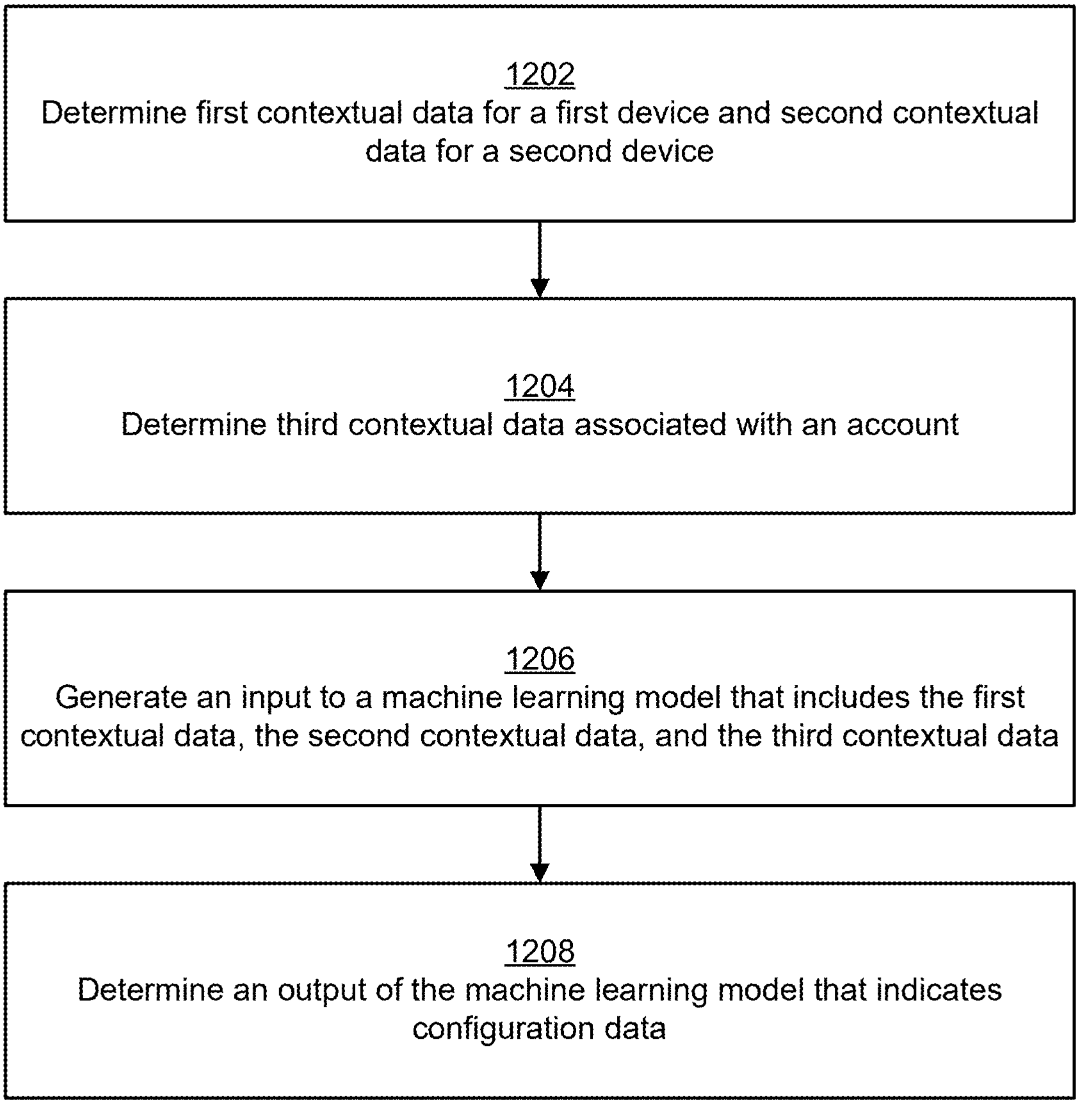
FIG. 12 illustrates an example flow for a process of using contextual data for action coordination using a machine learning model, according to an embodiment of the present disclosure.
Figure 13:
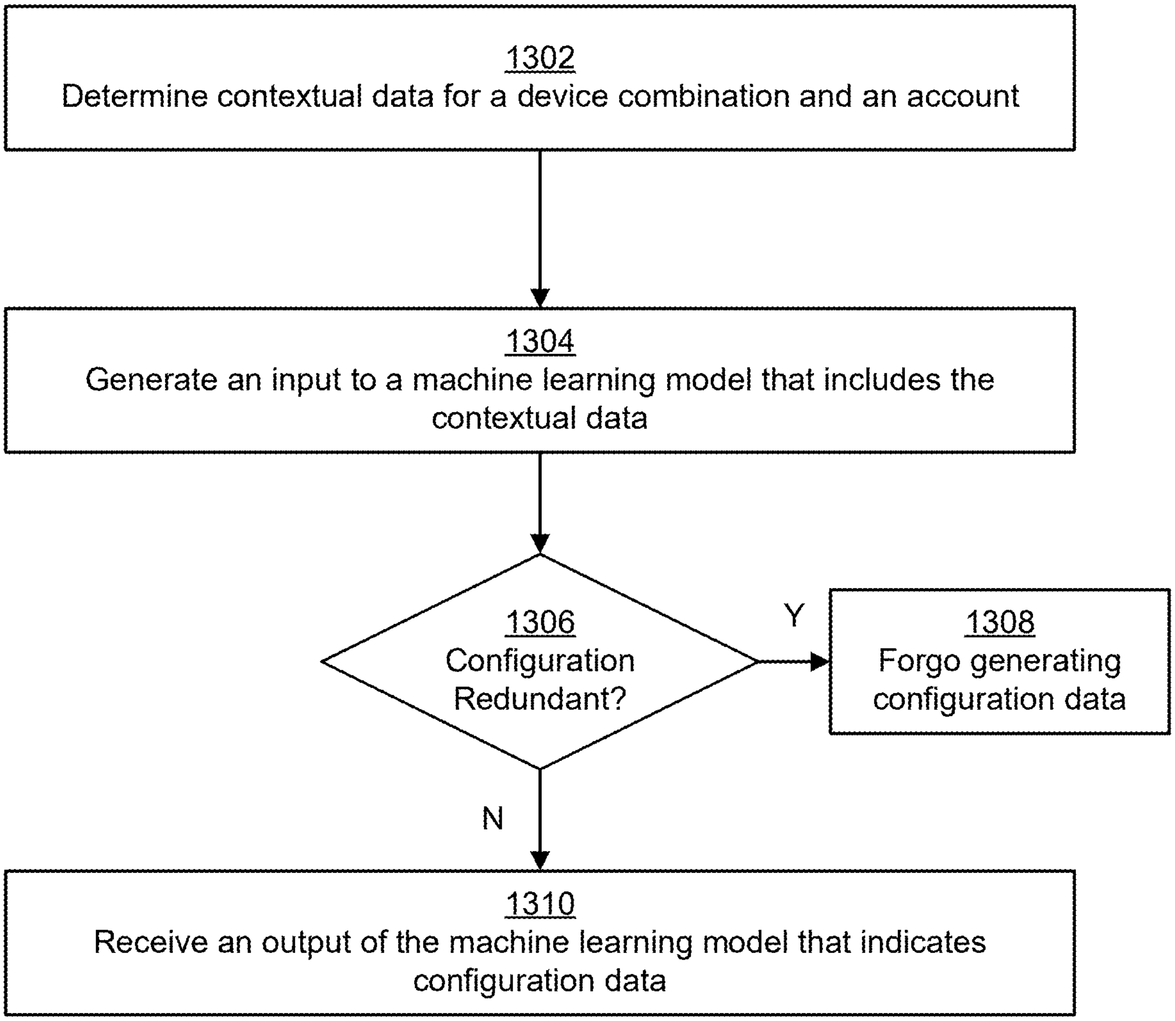
FIG. 13 illustrates an example flow for a process of using contextual data for action coordination using a machine learning model based on a device change, according to an embodiment of the present disclosure.

FIGS. 12-13 illustrate example flows for using automation data to determine configuration data generation. Instructions for performing the operations can be stored as computer-readable instructions on one or more non-transitory computer-readable media of a computer system (e.g., computer system 120 in FIG. 1). As stored, the instructions represent programmable modules that include code executable by one or more processors of the computer system. The execution of such instructions causes the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 12 illustrates an example flow for a process of using contextual data for action coordination using a machine learning model, according to an embodiment of the present disclosure. In an example, the flow includes operation 1202, where the computer system determines first contextual data for a first device and second contextual data for a second device. The first device and the second device are associated with an account. The first contextual data and the second contextual data indicate at least one of: a device name, a device location, a device-to-device proximity, a device group, a device supported capability, or a natural language description of device use.

In an example, the flow includes operation 1204, where the computer system determines third contextual data associated with the account. The third contextual data indicates a history of automating device-executable actions, existing action automations, automation usage history, past user interactions with or user inputs at devices associated with the account, timings of and sequences between such user interactions or user inputs, the types of requested or executed actions, and the like.

In an example, the flow includes operation 1206, where the computer system generates an input to a machine learning model that includes the first contextual data, the second contextual data, and the third contextual data.

In an example, the flow includes operation 1208, where the computer system determines an output of the machine learning model that indicates configuration data. The configuration data is associated with automating an action. The configuration data indicates that the action is to be executed by one of the first device or the second device upon a trigger being detected by the other one of the first device or the second device.

FIG. 13 illustrates an example flow for a process of using contextual data for action coordination using a machine learning model based on a device change, according to an embodiment of the present disclosure. In an example, the flow includes operation 1302, where the computer system determines contextual data for a device combination and an account. The first device and the second device are associated with the account. The contextual data for the first device and the second device indicates at least one of: a device name, a device location, a device-to-device proximity, a device group, a device supported capability, or a natural language description of device use. The contextual data for the account indicates a history of automating device-executable actions.

In an example, the flow includes operation 1304, where the computer system generates an input to a machine learning model. For example, this input includes the contextual data.

In an example, the flow includes operation 1306, where the computer system determines whether the configuration is redundant. The machine learning model can determine a candidate configuration (e.g., action, trigger, action device, trigger device) based on the contextual data. The machine learning model can compare the configuration to other configurations for the account based on the history of automating device-executable actions. If the configuration matches any other configurations, the flow proceeds to operation 1308. Otherwise, the flow proceeds to operation 1310.

In an example, the flow includes operation 1308, where the computer system forgoes generating configuration data. That is because the configuration is already existent.

In an example, the flow includes operation 1310, where the computer system receives an output of the machine learning model that indicates configuration data. The configuration data is associated with automating an action. The configuration data indicates that the action is to be executed by one of the first device or the second device upon a trigger being detected by the other one of the first device or the second device.

Figure 14:
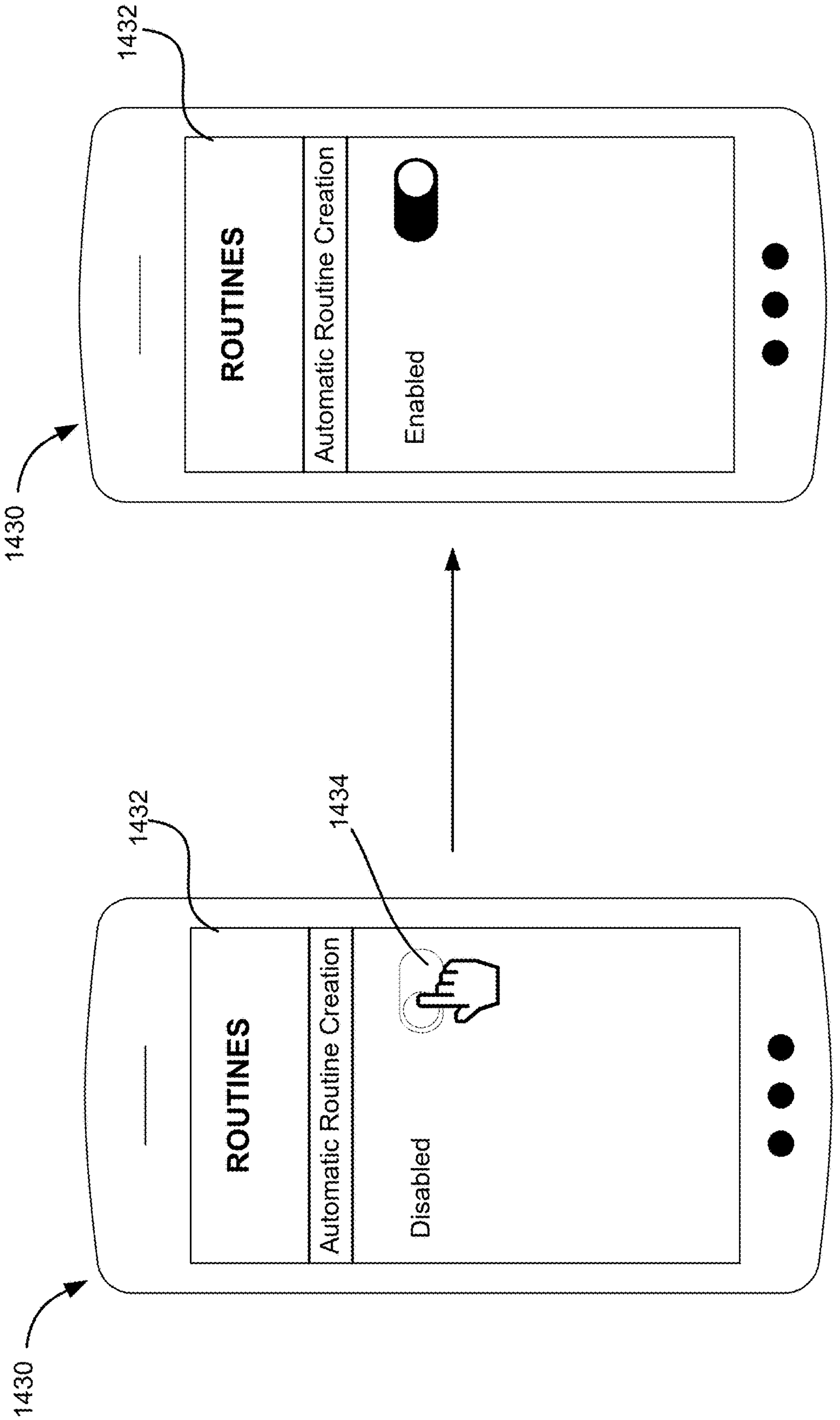
FIG. 14 illustrates an example of a user interface for providing permission for automated device-executable actions, according to an embodiment of the present disclosure.

FIG. 14 illustrates an example of a user interface 1432 for providing permission for automated device-executable actions, according to an embodiment of the present disclosure. The user interface 1432 is presented at a user device 1430. The user interface 1432 is associated with an account that is also associated with devices. A user may be able to turn ON and OFF a feature for automatically generating routines (or configurations) for the devices of the account. On the left side of FIG. 14, a toggle feature 1434 is shown as being OFF, indicating that automatic routine generation is disabled (e.g., not permitted, whereby a routine may not be generated and associated with the account automatically, or if generated, the routine may be recommended but not associated with the account unless user input is received confirming that the routine can be associated). As illustrated, a user can interact with the toggle feature 1434 to enable automatic routine generation. As a result, permission data indicating a permission to automate device-executable actions is associated with the account. So, when event data (e.g., device registration, device update, etc.) is received for a device of the account, the computer system can determine one or more device-executable actions to automate.

Figure 15:
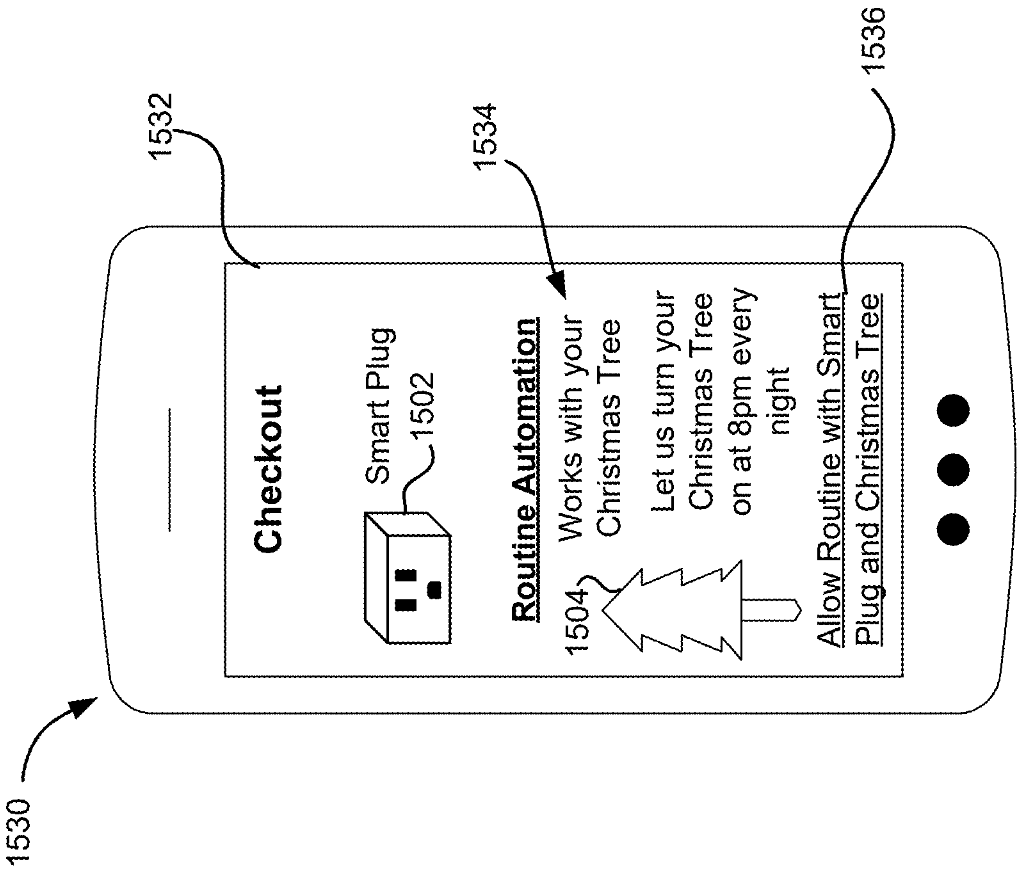
FIG. 15 illustrates an example of a user interface for showing an automated device-executable action in a web page for obtaining a device, according to an embodiment of the present disclosure.

FIG. 15 illustrates an example of a user interface 1532 for showing an automated device-executable action in a web page for obtaining a device, according to an embodiment of the present disclosure. The user interface 1532 is presented at a user device 1530. The user interface 1532 is associated with an account that is also associated with devices. A user interface 1532 presents a web page associated with obtaining a device 1502, illustrated as a smart plug. In addition, the web page includes a presentation of a description 1534 about an action and a trigger for a routine that can be implemented using the device 1502 and another device 1504, illustrated as a Christmas tree. The description 1534 indicates that the smart plug can be used to turn ON the Christmas tree every night at 8 pm. The network document includes a selectable link 1536 for allowing the routine to be implemented for the smart plug and the Christmas tree. Upon user selection of the link 1536 and registration of the smart plug with the account, the routine can then be implemented.

Figure 16:
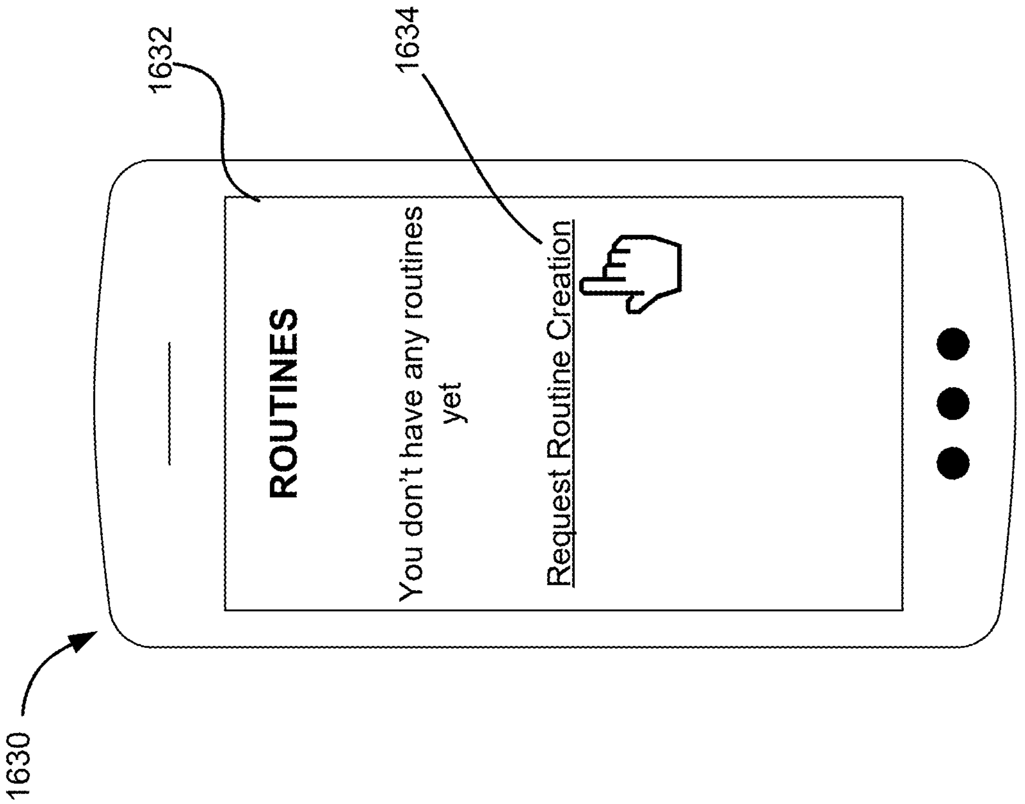
FIG. 16 illustrates an example of a user interface for requesting creation of an automated device-executable action, according to an embodiment of the present disclosure.

FIG. 16 illustrates an example of a user interface for requesting creation of an automated device-executable action, according to an embodiment of the present disclosure. The user interface 1632 is presented at a user device 1630. The user interface 1632 is associated with an account that is also associated with devices. The user interface 1632 indicates that the account does not have any routines configured yet. In addition, the user interface 1632 includes a link 1634 for requesting a routine (e.g., configuration data) be created for the devices associated with the account. Upon selection of the link 1634, a computer system (e.g., computer system 120 in FIG. 1) can determine contextual data about the devices to generate configuration data for automated device-executable actions.

Figure 17:
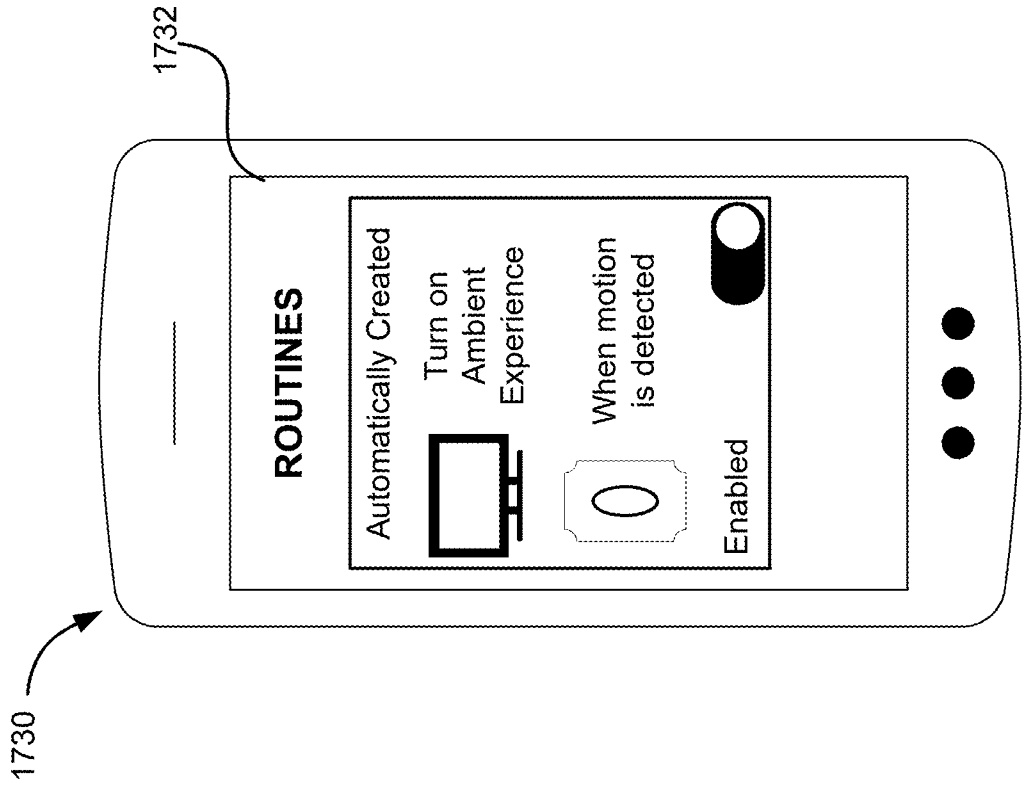
FIG. 17 illustrates an example of a user interface for showing a generated automated device-executable action, according to an embodiment of the present disclosure.

FIG. 17 illustrates an example of a user interface for showing a generated automated device-executable action, according to an embodiment of the present disclosure. The user interface 1732 is presented at a user device 1730. The user interface 1732 is associated with an account that is also associated with devices. The user interface 1732 displays a routine that has been automatically created (e.g., based on contextual data of the devices). The description of the routine includes an indication of the trigger and the action for the routine. For instance, as illustrated, the routine involves automatically turning ON an ambient experience of a smart television when motion is detected by a motion sensor. The user interface also includes a feature for enabling and disabling the routine.

Figure 18:
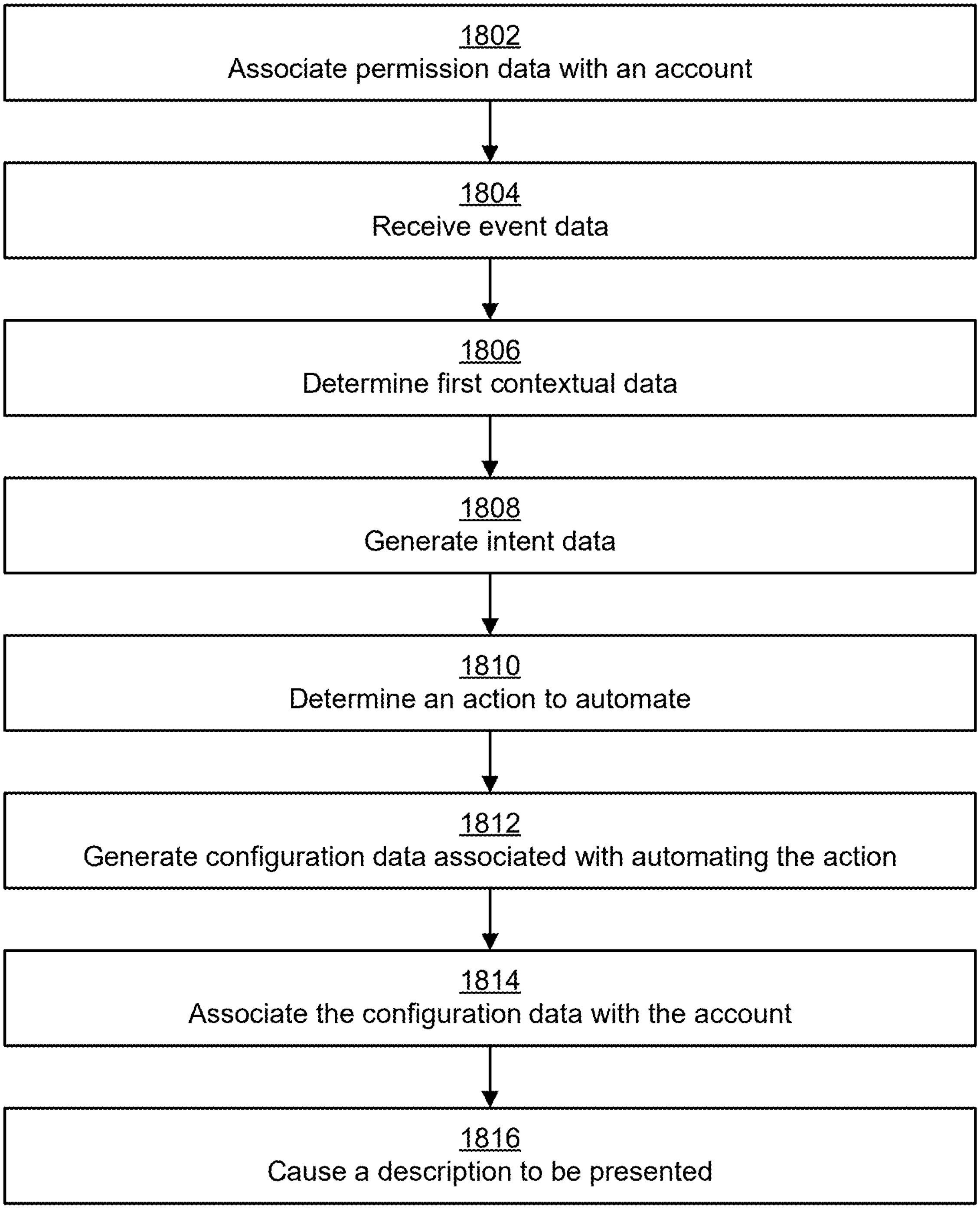
FIG. 18 illustrates an example flow of action automation, according to an embodiment of the present disclosure.
Figure 19:
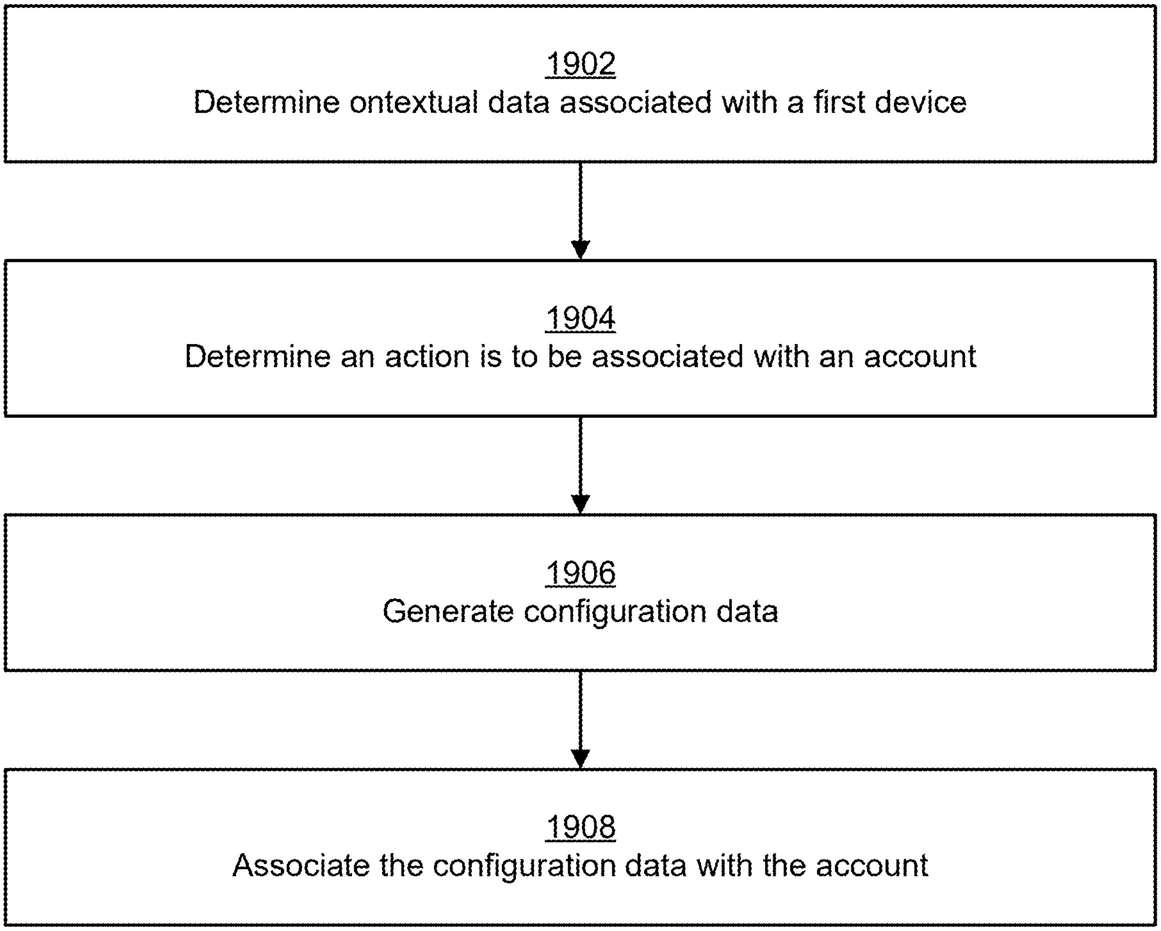
FIG. 19 illustrates another example flow for a process of action automation, according to an embodiment of the present disclosure.

FIGS. 18-19 illustrate example flows for generating automatic device-executable actions. Instructions for performing the operations can be stored as computer-readable instructions on one or more non-transitory computer-readable media of a computer system (e.g., computer system 120 in FIG. 1). As stored, the instructions represent programmable modules that include code executable by one or more processors of the computer system. The execution of such instructions causes the computer system to perform the specific operations shown in the corresponding figure and described herein. Each programmable module in combination with the respective processor(s) represents a means for performing a respective operation(s). While the operations are illustrated in a particular order, it should be understood that no particular order is necessary and that one or more operations may be omitted, skipped, and/or reordered.

FIG. 18 illustrates an example flow of action automation, according to an embodiment of the present disclosure. In an example, the flow includes operation 1802, where the computer system associates permission data with an account. The permission data indicates a permission to automate one or more device-executable actions.

In an example, the flow includes operation 1804, where the computer system receives event data. The event data indicates that a first device has been associated with the account, an update to the first device or the account, or a request to create a routine without specifically identifying the first device.

In an example, the flow includes operation 1806, where the computer system determines first contextual data. The first contextual data is associated with the first device. The first contextual data can indicate at least one of: a device type, a device identifier, or how the device is to be used in association with an account (e.g., as standalone device or a device from among a group of devices that are associated with the account, where execution of one or more actions are coordinated across the devices of the group). For instance, the first contextual data can include the device type, the device identifier. The first contextual data can be retrieved from a data store, where the computer system can use the device identifier in a query thereto. Although not illustrated in FIG. 18, the computer system can determine second contextual data associated with a second device (and similarly additional contextual data for any additional device), where the second device (and any of additional device) are associated with the account.

In an example, the flow includes operation 1808, where the computer system generates, intent data indicating an intended use of the first device in association with the second device (or any additional device). The intent data can be determined based on the first contextual data and, possibly, based on the second contextual data and/or any additional contextual data. In an example, the intent data can be determined by using automation data as described in FIG. 6 or by using a machine learning model as described in FIG. 9 or FIG. 11.

In an example, the flow includes operation 1810, where the computer system determines an action to automate. The computer system determines the action to automate based on the permission and the intent data. This determination can be based on using automation data as described in FIG. 6 or using a machine learning model as described in FIG. 9 or FIG. 11.

In an example, the flow includes operation 1812, where the computer system generates configuration data associated with automating the action. The configuration data indicates that the action is to be executed by one of the first device or the second device upon a trigger being detected by the other one of the first device or the second device.

In an example, the flow includes operation 1814, where the computer system associates the configuration data with the account. For instance, the action, trigger, action device, and trigger device are identified in a configuration that is stored as a file, where the file references the account (e.g., includes an identifier of this account) and is protected based on the account (e.g., encrypted with a key associated with the account).

In an example, the flow includes operation 1816, where the computer system causes a description to be presented. The description is of the action and the trigger. The description is presented via a user interface associated with the account.

FIG. 19 illustrates another example flow for a process of action automation, according to an embodiment of the present disclosure. In an example, the flow includes operation 1902, where the computer system determines contextual data associated with a first device. The first device is associated with an account. The contextual data can indicate at least one of: a device type, a device identifier, or how the device is to be used in association with an account (e.g., as standalone device or a device from among a group of devices that are associated with the account, where execution of one or more actions are coordinated across the devices of the group). For instance, the first contextual data can include the device type, the device identifier, a device name, a device location, a device-to-device proximity, a device group, a device supported capability, or a natural language description of device use. Although not illustrated in FIG. 19, the computer system can determine second contextual data associated with a second device (and similarly additional contextual data for any additional device), where the second device (and any of additional device) are associated with the account.

In an example, the flow includes operation 1904, where the computer system determines that an action is to be associated with the account. The action can be executable by one or more devices. Some or all of these devices can also be associated with the user account. The action can be determined by using, based on the contextual data, automation data as described in FIG. 6 or a machine learning model as described in FIG. 9 or FIG. 11.

In an example, the flow includes operation 1906, where the computer system generates configuration data. The configuration data is generated based on the first contextual data and the second contextual data. The configuration data indicates a trigger to be detected by at least one of the first device or the second device and an action to be executed by at least one of the first device or the second device upon the trigger being detected.

In an example, the flow includes operation 1908, where the computer system associates the configuration data with the account. For instance, the action, trigger, action device, and trigger device are identified in a configuration that is stored as a file, where the file references the account (e.g., includes an identifier of this account) and is protected based on the account (e.g., encrypted with a key associated with the account).

Figure 20:
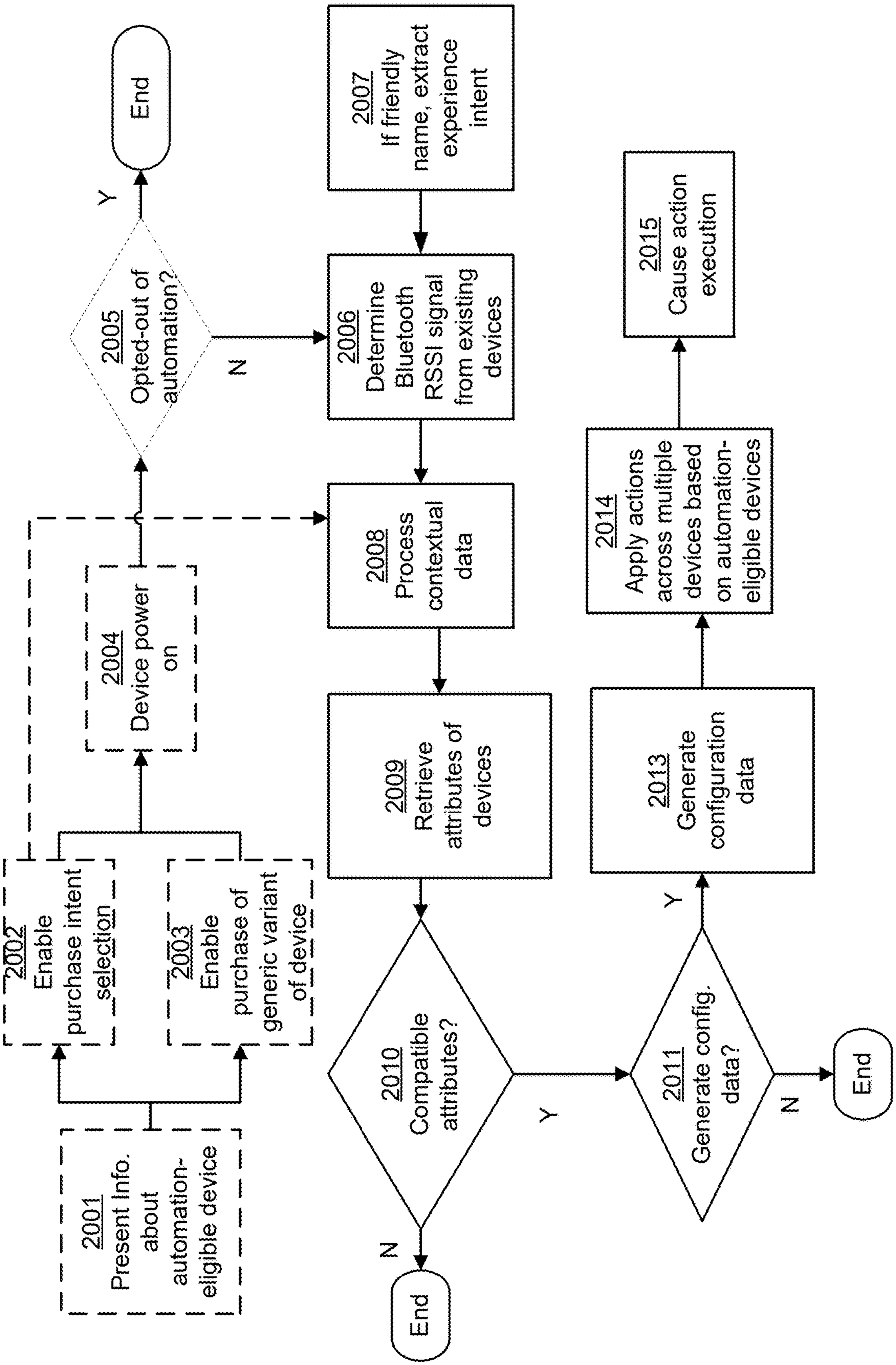
FIG. 20 illustrates an example flow diagram for action coordination for multiple devices, according to an embodiment of the present disclosure.

FIG. 20 illustrates an example flow diagram for action coordination for multiple devices, according to an embodiment of the present disclosure. In FIG. 20, operations shown with a dashed outline may be formed by a user device (e.g., user device 130 in FIG. 1) and or a purchased device (e.g., the smart light bulb, referred to as device in the flow) and operations shown with a solid outline may be performed by a computer system (e.g., computer system 120 in FIG. 1). While the operations are illustrated in a particular order, it should be understood that no particular order is necessary and that one or more operations may be omitted, skipped, and/or reordered.

In an example, operation 2001 involves the user device presenting information about an automation-eligible device. The information may be presented, via a user interface of the user device, at a webpage for an online marketplace that offers the automation-eligible device for sale. At operation 2002, the user device can enable a user operating the user device to choose, via the user interface, a purchase intent via the user device. For instance, the user device may receive user input that selects a reason for the purchase of the device from a provided list of reasons. At operation 2003, the user device enables a generic variant of the device to be purchases. The generic variant may correspond to the automation-eligible device or another device that is configured to perform a similar function as the discovered automation-eligible device. The purchase can be enabled via the user interface presenting the web page. Note that although operation 2002 and 2003 are shown as parallel operations in FIG. 20, these operations may be performed sequentially in either order (e.g., operation 2002 occurs before operation 2003, operation 2003 occurs before operation 2002). At operation 2004, the device is powered on. The device may be powered on via a power on button. At operation 2005, the user device determines permission data indicating whether automation is opted in or out. The user device can lookup permission data of a user account of the user to determine whether the automation is opted in or out. If opted out, the process can end. Otherwise, the process can proceed to operation 2006.

In an example, at operation 2006 the computer system determines a received signal strength indicator (RSSI) signal from existing devices. The existing devices are associated with a same user account as the new device. For instance, the existing devices can communicate using Bluetooth. Each of such devices can measure an RSSI of a wireless signal (e.g., Bluetooth, WiFi, etc.) received from another device and can send this measurement as measurement data that identifies the two devices. The measurement data can be sent to the computer system from each of the devices or can be collected by one of the devices and sent therefrom to the computer system. In addition, at operation 2007, the computer system determines if a friendly name of the device exists. The friendly name can be contextual data associated with the device and can be determined from account data of the user account. For example, during setup, a user may decide to rename their device to indicate where it is located (e.g., “porch light”). The new name is the “friendly name.” If the friendly name exists, the computer system can extract an experience intent that indicates an intended use of the device in association with the user account. For instance, a device may have a friendly name of “porch light” with an existing smart doorbell in the same group. So, the experience intent may be to provide light for the smart doorbell. Operation 2008 involves the computer system processing contextual data. The contextual data can indicate the purchase intent from operation 2002, the RSSI signal from operation 2006, and potentially the experience intent. Operation 2009 involves retrieving attributes about the existing devices. The attributes can include, for a device, information about a device type, device capabilities, network connectivity, and other attributes that describe the possible use of the device. The attributes can be retrieved from the account data of the user account. At operation 2010, the computer system determines whether attributes of each existing device are compatible with attributes of the device. Attributes of two devices are compatible when their capabilities allow the two devices to coordinate the execution of an action (e.g., when one device can execute the action, and the other device can detect a trigger for the execution). If there are no compatible attributes, the process can end. Otherwise, the process can proceed to operation 2011 with existing devices having attributes compatible with those of the device.

In an example, operation 2011 involves the computer system determining, for each combination of a compatible existing device and the device, the corresponding contextual data of the two devices. The computer system can process the contextual data by using automation data or an ML model as described herein above to determine whether configuration data is to be generated. For instance, the contextual data of the device includes the RSSI signal measurement between the device and the existing device and the purchase intent. The contextual data can also include, for each of the two devices, data related to backend services (e.g., group assignment, friendly name), and device location. Based on the contextual data, the computer system can generate a confidence score. If the confidence score is not above the threshold, the process can end, Otherwise, the process proceeds to operation 2013, where the computer system generates the configuration data. Here, the configuration data indicates the action, the trigger, the action device among the devices, and the trigger device among the devices. The configuration data can be stored as part of the account data. The computer system can also instruct the trigger device about the trigger. At operation 2015, the computer system causes an execution of the action. For example, the computer system receives event data from the trigger device indicating that the trigger is detected. In response, the computer system instructs the action device to execute the action.

Figure 21:
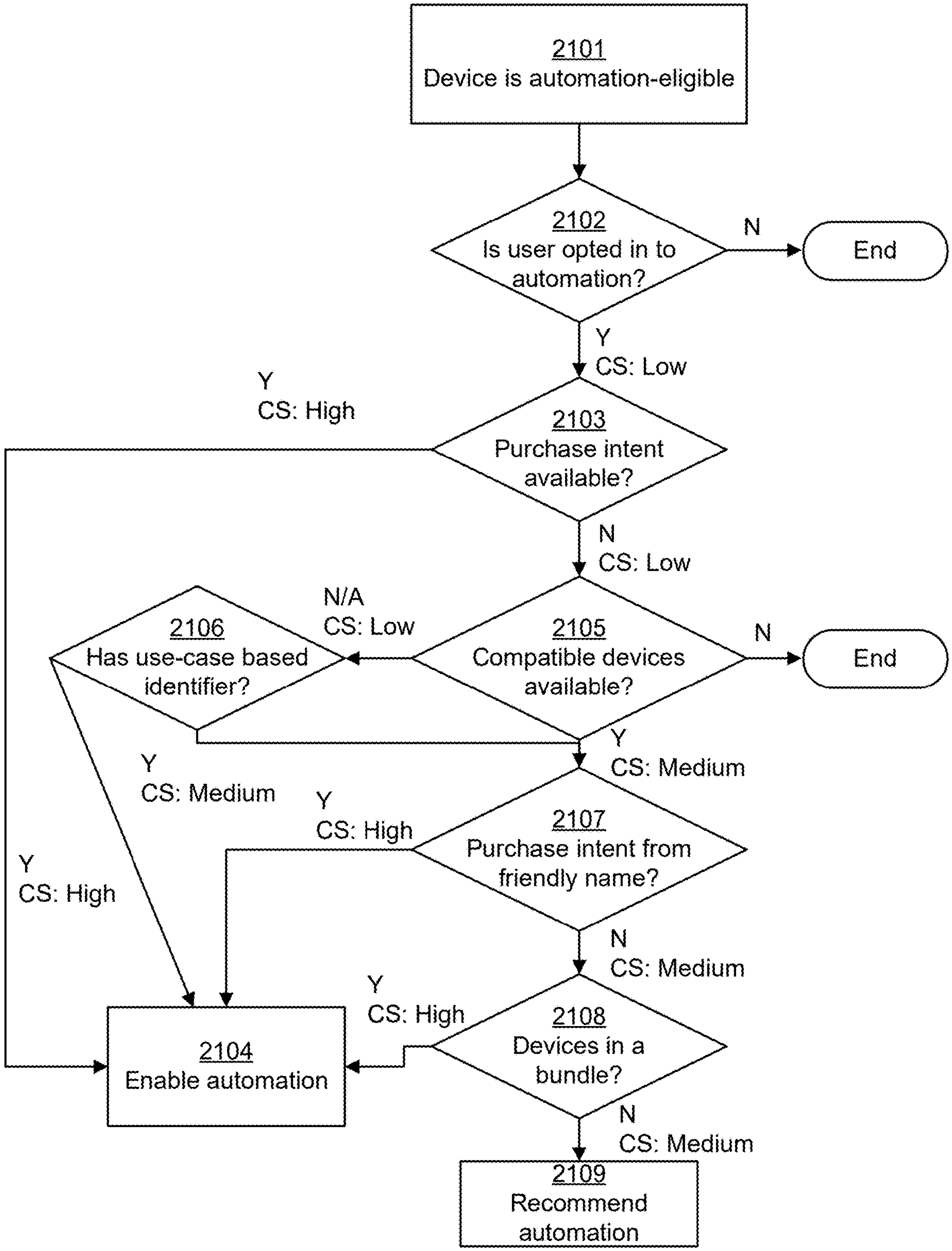
FIG. 21 illustrates another example flow diagram for action coordination for multiple devices, according to an embodiment of the present disclosure.

FIG. 21 illustrates another example flow diagram for action coordination for multiple devices, according to an embodiment of the present disclosure. Operations shown may be performed by a computer system (e.g., computer system 120 in FIG. 1). The flow is provided herein for illustrative purposes only by processing specific types of contextual data. However, the embodiments are not limited as such. While the operations are illustrated in a particular order, it should be understood that no particular order is necessary and that one or more operations may be omitted, skipped, and/or reordered.

Operation 2101 involves the computer system determining that a device is automation eligible. The device may be automation-eligible if the device includes certain capabilities. At operation 2102, the computer system determines whether a user is opted in to automation. The computer system checks permission data associated with the user to determine whether the user has opted in to automation. If the user has not opted in, the process can end. Otherwise, if the user is determined to be opted in with a low confidence score, the process can proceed to operation 2103. Operation 2103 involves the computer system determining whether a purchase intent is available. The purchase intent is one example of intent indicating how a user may plan to use the device. For example, the purchase intent can be entered as information at a webpage of the website at the time the device is purchased via the website. The information can describe that the reason the device is purchased is to be used in a specific manner in association with or independently of other devices. If the computer system determines that there is a purchase intent available with a high confidence score (e.g., exceeding a predefined threshold), the process can proceed to operation 2104. In some embodiments, a ML model can process the information entered about the purchase intent (e.g., the natural language description of the intended use of the device) to determine the intended use and the related confidence score. In some embodiments, the information can describe an explicit intent by including particular keywords or by being selected from a predefined list of possible intents. In such embodiments, no ML model may be used. Instead, of the explicit intent is described, a high confidence score (e.g., exceeding a predefined threshold) is determined. Otherwise, a low confidence score (e.g., smaller than the predefined threshold) is determined. At operation 2104, the computer system enables the automation. The automation (e.g., trigger device, target device, trigger, and action) can be determined based on the device and the purchase intent (e.g. contextual data associated with the device can be processed using automation data or an ML model). If at operation 2103, the computer system determines that there is not a purchase intent available with a low confidence score (e.g., falling below a predefined threshold), the process can proceed to operation 2105. Otherwise, the process can end.

In an example, operation 2105 involves the computer system determining compatible devices are available. The device can be associated with a user account, and the computer system can search account data of the user account to determine the devices and their attributes to then determine the compatibility. A ML model can process the information about the attributes to determine if two devices are compatible and the related confidence score. If there are no compatible devices associated with the user account, the process can end. If there is a low confidence score (e.g., lower than a predefined threshold), the process can proceed to operation 2106. At operation 2106, the computer system determines whether the device has a use-case based identifier. The use-case based identifier can correspond to an experience intent. An experience intent can be associated with a type and/or capability of a device. For instance, the device can enable a particular user experience (e.g., in the case of a smart speaker, the user experience can involve outputting audio by the device). An action associated with the user experience can be a candidate action for automation (e.g., in the case of a smart speaker, the candidate action can be outputting audible alarms). Here also, an ML model can process information entered about the experience intent (e.g., a device name, a natural description of the intended use, etc.) to determine the experience intent and the related confidence score. In other embodiments, the user experience and related candidate actions can be predefined and pre-associated with the type of the device and/or a serial number of the device. If the confidence score is larger than a predefined threshold, the process can proceed to operation 2104 to enable the automation. If there is a medium confidence score (e.g, falling between two predefined thresholds), the process can proceed to operation 2107. At operation 2107, the computer system determines whether the purchase intent can be determined from a friendly name of the device. A ML model can process the friendly name to output the purchase intent (if possible) and a related confidence score. If the purchase intent can be determined with a high confidence score (e.g., exceeding a predefined threshold), the process can proceed to operation 2104. If the purchase intent cannot be determined with a medium confidence score (e.g., falling between two predefined thresholds), the process can proceed to operation 2108. Otherwise, the process may end. At operation 2018, the computer system determines if the device is included in a bundle. Being included in a bundle can mean that the device is obtained or purchased in a grouping with one or more other devices that are intended to work together to perform a function. The computer system can make this determined by looking up the account data, where the account data can include purchase data indicating that the device was purchased in a bundle and identifying the bundled devices. A ML model process the account data (e.g., the purchase data stored over a period time, such as the last sixty days), and output an indication of the bundle purchase (if any) and a related confidence score. On other embodiments, it may be possible that no ML model is used. Instead, the account data can include a description of an explicit intent for using the bundled device in a particular way. In this case, the description can result in a high confidence score being determined. If the device is determined to be in a bundle with a high confidence score (e.g., exceeding a predefined threshold), the process can proceed to operation 2104. If the device is determined to not be in a bundle with a medium confidence score (e.g., falling between two predefined thresholds), then the process can proceed to operation 2109. Otherwise, the process can end. At operation 2109, the computer system recommends an automation. The recommendation can be sent to a user device (e.g., the user device 130 of FIG. 1). If the user input is received back from the user device and confirms that the automation is to be performed, the computer system can enable the automation per operation 2104.

Storage and/or use of data related to a particular person or device may be controlled by a user using privacy controls associated with a device and/or a companion application associated with the device. Accordingly, users may opt out of storage of data and/or may select particular types of data that may be stored while preventing aggregation and storage of other types of data. Additionally, aggregation, storage, and use of information, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

Figure 22:
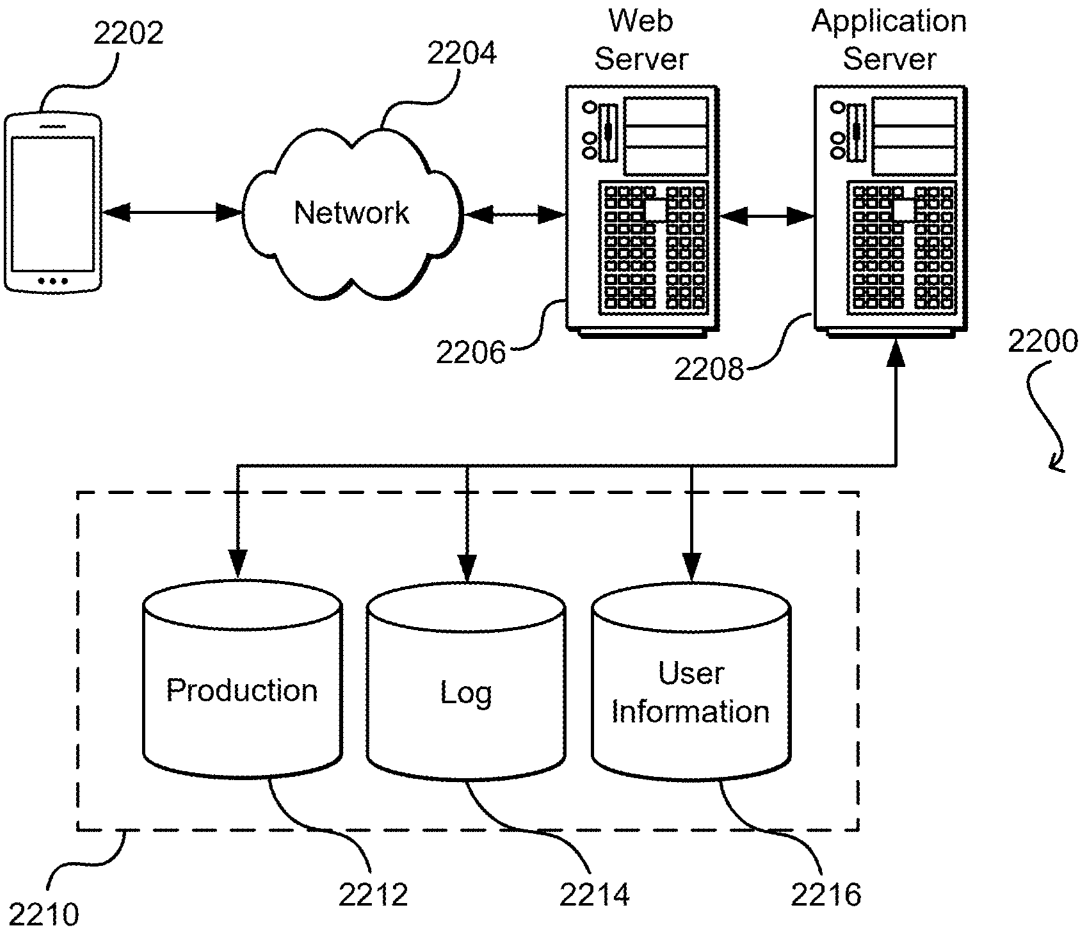
FIG. 22 illustrates aspects of an example environment for implementing aspects in accordance with various embodiments.

FIG. 22 illustrates aspects of an example environment 2200 for implementing aspects in accordance with various embodiments. As will be appreciated, although a Web-based environment is used for purposes of explanation, different environments may be used, as appropriate, to implement various embodiments. The environment includes an electronic client device 2202 (e.g., an example of the user device 130 of FIG. 1), which can include any appropriate device operable to send and receive requests, messages, or information over an appropriate network 2204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 2206 for receiving requests and serving content in response thereto, although for other networks an alternative device serving a similar purpose could be used as would be apparent to one of ordinary skill in the art.

The illustrative environment includes at least one application server 2208 (e.g., an example of the computer system 120 of FIG. 1) and a data store 2210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 2202 and the application server 2208, can be handled by the Web server. It should be understood that the Web and application servers are not required and are merely example components, as structured code discussed herein can be executed on any appropriate device or host machine as discussed elsewhere herein.

The data store 2210 can include several separate data tables, databases or other data storage mechanisms and media for storing data relating to a particular aspect. For example, the data store illustrated includes mechanisms for storing production data 2212 and user information 2216, which can be used to serve content for the production side. The data store also is shown to include a mechanism for storing log data 2214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 2210. The data store 2210 is operable, through logic associated therewith, to receive instructions from the application server 2208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 2202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 22. Thus, the depiction of the system 2200 in FIG. 22 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

one or more processors; and one or more memories storing instructions that, upon execution by the one or more processors, configure the system to:

associate permission data with an account, the permission data indicating a permission to automate one or more device-executable actions;

receive event data indicating that a first device has been associated with the account, the first device associated with a first category of devices;

determine first contextual data associated with the first device, the first contextual data indicating at least one of: a device type, a device identifier, or how the first device is to be used in association with the account;

generate, based at least in part on the first contextual data, intent data indicating an intended use of the first device in association with a second device, the second device associated with a second category of devices;

determine an action to automate based at least in part on the permission data and the intent data;

generate, prior to occurrence of the intended use and without a user input that indicates the action or a trigger event for the action, configuration data associated with automating the action, the configuration data indicating, based at least in part on the second device being associated with the second category, that the action is to be executed by the second device upon the trigger event being detected by the other one of the first device or the second device;

associate the configuration data with the account such that, upon the trigger event being detected, the first device or the second device is instructed to execute the action; and cause a description of the action and the trigger event to be presented via a user interface associated with the account.

2. The system of claim 1, wherein the intent data is generated by at least:

determining automation data associated with a device combination that includes the first device and the second device, wherein the automation data indicates the action, the trigger event, the first category of devices to detect the trigger event, the second category of devices to execute the action, and conditions to be met for the intended use to be determined;

determining that the first contextual data and second contextual data associated with the second device indicate that a subset of the conditions is met;

generating, based on the subset, a confidence score associated with the intended use; and wherein the configuration data is generated by at least:

determining that the first device is to detect the trigger event based at least in part on the first device being associated with the first category; and determining that the second device is to execute the action based at least in part on the second device being associated with the second category, wherein the configuration data is generated based at least in part on the confidence score exceeding a threshold score and indicates that the first device is to detect the trigger event and the second device is to execute the action.

3. The system of claim 1, wherein the intent data is generated by at least:

determining automation data associated with a device combination that includes the first device and the second device;

generating an input to a machine learning model that includes the automation data, the first contextual data, and second contextual data associated with the second device; and determining an output of the machine learning model, wherein the output corresponds to the input and indicates the intent data.

4. The system of claim 1, wherein the intent data is generated by at least:

determining third contextual data associated with the account, wherein the third contextual data indicates a history of automating device-executable actions;

generating an input to a machine learning model that includes the first contextual data, the second contextual data, and the third contextual data; and determining an output of the machine learning model, wherein the output corresponds to the input and indicates the intent data.

5. A computer-implemented method, comprising:

determining contextual data associated with a first device, the contextual data indicating at least one of: a device type, a device identifier, or how the first device is to be used in association with an account;

determining, based at least in part on the contextual data and prior to occurrence of a trigger event for an action executable by one or more devices, that the action is to be associated with the account in support of a use of the first device;

generating, prior to the occurrence of the trigger event and without a user input that indicates the action or the trigger event, configuration data indicating the action and the trigger event, the action to be executed by the one or more devices based at least in part on the occurrence of the trigger event; and associating the configuration data with the account.

6. The computer-implemented method of claim 5, further comprising:

receiving event data indicating an association of the first device with the account, and wherein the contextual data is determined based at least in part on the association; and causing, based at least in part on the configuration data being associated, a user interface associated with the account to output a description of the action and the trigger event.

7. The computer-implemented method of claim 5, wherein the contextual data is first contextual data, and wherein the computer-implemented method further comprises:

determining event data indicating a change from second contextual data associated with the first device to the first contextual data; and causing a user interface to present a description of the configuration data because of the change.

8. The computer-implemented method of claim 7, wherein generating the configuration data comprises at least one of:

determining that the configuration data is different from other configuration data already associated with the account; or generating an input to a machine learning model based at least in part on the other configuration data, the first contextual data, and the second contextual data, wherein the configuration data is indicated by an output of the machine learning model in response to the input.

9. The computer-implemented method of claim 5, further comprising:

causing a user interface associated with the account to output a notification associated with the configuration data, the notification being output based at least in part on:

an indication of at least one of: an occurrence of the trigger event or an execution of the action, or the configuration data being associated with the first device.

10. The computer-implemented method of claim 5, further comprising:

receiving, via a user interface associated with the account, a request to automate one or more device-executable actions, wherein the configuration data is generated further based at least in part on the request; and causing the user interface to present a description of the action and the trigger event.

11. The computer-implemented method of claim 5, further comprising:

receiving, prior to the contextual data being determined, an indication that a network document is to be presented via a user interface, wherein the network document is associated with obtaining the first device, wherein the configuration data is generated further based at least in part on the indication; and causing the user interface to present a description of the action and the trigger event in a presentation of the network document.

12. One or more computer-readable storage media storing instructions that, upon execution by one or more processors, cause operations comprising:

determining contextual data associated with a first device, the contextual data indicating at least one of: a device type, a device identifier, or how the first device is to be used in association with an account;

determining, based at least in part on the contextual data and prior to occurrence of a trigger event for an action executable by one or more devices, that the action is to be associated with the account in support of a use of the first device;

generating, prior to the occurrence of the trigger event and without a user input that indicates the action or the trigger event, configuration data indicating the action and the trigger event, the action to be executed by the one or more devices based at least in part on the occurrence of the trigger event; and associating the configuration data with the account.

13. The one or more computer-readable storage media of claim 12, storing additional instructions that, upon execution by one or more processors, cause additional operations comprising:

including, in the configuration data, an indication that the first device is to execute the action and that a second device is to detect the trigger event;

instructing the second device to send event data upon the trigger event being detected;

receiving, from the second device, the event data; and instructing the first device to execute the action.

14. The one or more computer-readable storage media of claim 13 storing additional instructions that, upon execution by one or more processors, cause additional operations comprising:

determining that the first device and the second device are associated with the account, wherein the contextual data is first contextual data;

retrieving, from a data store storing account data for a plurality of accounts, the first contextual and second contextual data associated with the account; and determining that the first contextual data and the second contextual data indicate that a condition is met, wherein the configuration data is generated further based at least in part on the condition being met and the first device and the second device being associated with the account.

15. The one or more computer-readable storage media of claim 12 storing additional instructions that, upon execution by one or more processors, cause additional operations comprising:

retrieving, from a data store, automation data associated with the first device and a second device and including information about the action, the trigger event, and conditions to be met to generate the configuration data, wherein the contextual data is first contextual data; and determining that the first contextual data and second contextual data associated with the second device indicate that one or more of the conditions are met, wherein the configuration data is generated further based at least in part on the one or more of the conditions being met.

16. The one or more computer-readable storage media of claim 15 storing further instructions that, upon execution by one or more processors, cause further operations comprising:

determining a first change to the first contextual data; and generating a second change to the configuration data based at least in part on the first change, wherein the second change indicates at least one of: a different trigger event to be detected, a different device to detect the trigger event, a different action, or a different device to execute the action.

17. The one or more computer-readable storage media of claim 15 storing further instructions that, upon execution by one or more processors, cause further operations comprising:

determining, from the automation data, a first category for devices to detect the trigger event and a second category of devices to execute the action;

determining that the first device is associated with the first category; and determining that the second device is associated with the second category, wherein the configuration data indicates that the first device is to detect the trigger event and the second device is to execute the action.

18. The one or more computer-readable storage media of claim 12 storing additional instructions that, upon execution by one or more processors, cause additional operations comprising:

generating an input to a machine learning model based at least in part on the contextual data, wherein an output of the machine learning model in response to the input includes the configuration data.

19. The one or more computer-readable storage media of claim 12 storing additional instructions that, upon execution by one or more processors, cause additional operations comprising:

determining a confidence score associated with the configuration data; and performing one of: causing a user interface to present a notification associated with generating the configuration data based at least in part on the confidence score being smaller than a threshold score, or foregoing a presentation of the notification via the user interface based at least in part on the confidence score being larger than the threshold score.

20. The one or more computer-readable storage media of claim 12 storing additional instructions that, upon execution by one or more processors, cause additional operations comprising:

determining a confidence score associated with one of the first device and a second device executing the action upon the trigger event being detected by the one of the first device and the second device, wherein the configuration data is generated further based at least in part on the confidence score.

21. The one or more computer-readable storage media of claim 12, storing additional instructions that, upon execution by one or more processors, cause additional operations comprising:

determining automation data associated with the first device, wherein the automation data indicates the action, the trigger event, a first category for devices to detect the trigger event, a second category of devices to execute the action, and conditions to be met;

determining, based at least in part on the contextual data, that at least a subset of the conditions is met;

determining that the first device is to detect the trigger event based at least in part on the first device being associated with the first category; and determining that the first device or a second device is to execute the action based at least in part on the first device or the second device being associated with the second category, wherein the configuration data indicates that the first device is to detect the trigger event and the first device or the second device is to execute the action.

22. The one or more computer-readable storage media of claim 12, storing additional instructions that, upon execution by one or more processors, cause additional operations comprising:

determining automation data associated with the first device, wherein the automation data indicates the action, the trigger event, a first category for devices to detect the trigger event, a second category of devices to execute the action, and conditions to be met;

generating an input to a machine learning model, wherein the input includes the automation data and the contextual data; and determining an output of the machine learning model, wherein the output corresponds to the input and includes the configuration data.

23. The one or more computer-readable storage media of claim 12, wherein the configuration data indicates that the action is to be executed by a second device that is associated with a different category than the first device.

* * * * *